(12) United States Patent
Batty

(10) Patent No.: US 10,723,039 B2
(45) Date of Patent: Jul. 28, 2020

(54) COMPOSITE WOOD PANELS WITH CORRUGATED CORES AND METHOD OF MANUFACTURING SAME

(71) Applicant: 2464357 Ontario Inc., Perth (CA)

(72) Inventor: Ronald J. Batty, Perth (CA)

(73) Assignee: BONDCORE, OÜ (EE)

(*) Notice: Subject to any disclaimer, the term of this patent is extended or adjusted under 35 U.S.C. 154(b) by 286 days.

(21) Appl. No.: 15/414,810

(22) Filed: Jan. 25, 2017

(65) Prior Publication Data
US 2017/0266839 A1 Sep. 21, 2017

(30) Foreign Application Priority Data
Mar. 21, 2016 (CA) ........................ 2924288

(51) Int. Cl.
*B32B 3/28* (2006.01)
*B32B 21/02* (2006.01)
(Continued)

(52) U.S. Cl.
CPC ............... *B27N 7/00* (2013.01); *B27N 3/002* (2013.01); *B27N 3/04* (2013.01); *B27N 5/00* (2013.01); *B27N 7/005* (2013.01); *B32B 3/28* (2013.01); *B32B 7/03* (2019.01); *B32B 7/12* (2013.01); *B32B 7/14* (2013.01); *B32B 21/02* (2013.01); *B32B 21/13* (2013.01); *B32B 37/06* (2013.01); *B32B 37/10* (2013.01); *B32B 37/18* (2013.01); *B32B 38/0004* (2013.01); *B32B 38/0012* (2013.01); *B32B 38/08* (2013.01); *B32B 2250/03* (2013.01); *B32B 2250/05* (2013.01); *B32B 2250/40* (2013.01); *B32B 2250/42* (2013.01); *B32B 2255/08* (2013.01);
(Continued)

(58) Field of Classification Search
CPC .......... B32B 3/28; B32B 29/08; B32B 21/02; B32B 21/13
See application file for complete search history.

(56) References Cited

U.S. PATENT DOCUMENTS

| | | | |
|---|---|---|---|
| 733,508 A | 7/1903 | Redd | |
| 962,619 A | 6/1910 | Bufpelen | |

(Continued)

FOREIGN PATENT DOCUMENTS

| | | |
|---|---|---|
| CA | 2928240 A1 | 5/2015 |
| WO | WO 2011/051566 A1 | 5/2011 |

OTHER PUBLICATIONS

Yang Cao, Characterization of PF/PVC Hybrid Adhesive-Wood Interaction and its Effect on Wood Strand Composites Performance, Aug. 2010.

(Continued)

*Primary Examiner* — Mark A Osele
*Assistant Examiner* — Christopher C Caillouet
(74) *Attorney, Agent, or Firm* — J. Bennett Mullinax, LLC

(57) ABSTRACT

A composite wood panel is manufactured from thin wood laminae cut from wood unsuitable for peeler logs or dimensional lumber. A cold set adhesive is applied to the wood laminae and they are formed into a randomly oriented mat that is cold rolled into a thin, pliable cold rolled stock that can be corrugated. A hot set adhesive may also be applied to the laminae to improve strength of the composite wood panel. The hot set adhesive is set in a hot press after the cold rolled stock is produced.

21 Claims, 15 Drawing Sheets

(51) Int. Cl.

| | | |
|---|---|---|
| *B32B 21/13* | (2006.01) | |
| *B32B 29/08* | (2006.01) | |
| *B27N 7/00* | (2006.01) | |
| *B27N 5/00* | (2006.01) | |
| *B32B 7/14* | (2006.01) | |
| *B32B 7/03* | (2019.01) | |
| *B27N 3/00* | (2006.01) | |
| *B27N 3/04* | (2006.01) | |
| *B32B 7/12* | (2006.01) | |
| *B32B 37/06* | (2006.01) | |
| *B32B 37/10* | (2006.01) | |
| *B32B 37/18* | (2006.01) | |
| *B32B 38/00* | (2006.01) | |
| *B32B 38/08* | (2006.01) | |

(52) U.S. Cl.
CPC ... *B32B 2307/7145* (2013.01); *B32B 2317/16* (2013.01); *B32B 2419/00* (2013.01); *B32B 2439/62* (2013.01); *B32B 2439/70* (2013.01)

(56) References Cited

U.S. PATENT DOCUMENTS

| | | | |
|---|---|---|---|
| 1,572,896 A | 1/1926 | Longley | |
| 2,373,736 A | 4/1945 | Bolung | |
| 2,442,492 A | 6/1948 | Englert et al. | |
| 2,465,941 A | 3/1949 | Steen | |
| 2,542,804 A | 1/1951 | Stokes et al. | |
| 2,640,517 A | 6/1953 | De Mello | |
| 2,689,092 A | 9/1954 | Clark et al. | |
| 2,766,787 A | 10/1956 | Knowles | |
| 2,772,789 A | 12/1956 | Clark | |
| 2,786,005 A | 3/1957 | Clark | |
| 2,840,127 A | 6/1958 | Stokes et al. | |
| 2,853,413 A * | 9/1958 | Christian | B27N 3/20 428/113 |
| 3,025,895 A | 1/1960 | Girard | |
| 3,003,204 A | 10/1961 | Bryant | |
| 3,164,511 A | 1/1965 | Elmndorf | |
| 3,286,745 A | 11/1966 | Meis | |
| 3,338,767 A | 8/1967 | Charles | |
| 3,563,844 A * | 2/1971 | Brown | B27D 1/00 428/292.4 |
| 3,721,329 A | 3/1973 | Turner et al. | |
| 3,913,643 A | 10/1975 | Lambert | |
| 4,185,787 A | 1/1980 | Plyler | |
| 4,241,133 A | 12/1980 | Lund et al. | |
| 4,346,744 A | 8/1982 | Beer et al. | |
| 4,408,544 A | 10/1983 | Haataja | |
| 4,440,708 A | 4/1984 | Haataja | |
| 4,469,216 A | 9/1984 | Haataja et al. | |
| 4,675,138 A | 6/1987 | Bach et al. | |
| 4,816,103 A | 3/1989 | Ernest | |
| 4,960,553 A | 10/1990 | Debruine et al. | |
| 4,964,447 A | 10/1990 | Farrell et al. | |
| 5,002,713 A | 3/1991 | Palardy et al. | |
| 5,047,280 A | 9/1991 | Bach | |
| 5,090,173 A * | 2/1992 | Coggan | E04F 13/0864 162/109 |
| 5,143,311 A | 9/1992 | Laster | |
| 5,152,025 A | 10/1992 | Aukeman et al. | |
| 5,427,162 A | 6/1995 | Carter | |
| 5,732,460 A | 3/1998 | Paternoster et al. | |
| 5,769,204 A | 6/1998 | Okada et al. | |
| 5,948,198 A | 9/1999 | Blyt | |
| 6,152,200 A | 11/2000 | Smothers | |
| 6,511,567 B1 | 1/2003 | Ruggie et al. | |
| 6,916,523 B2 | 6/2005 | Haataja | |
| 6,997,692 B2 | 2/2006 | Pearson | |
| 7,021,339 B2 | 4/2006 | Hagiwara et al. | |
| 7,077,988 B2 | 7/2006 | Gosselin | |
| 7,404,918 B1 * | 7/2008 | Hejna | B27N 7/00 264/109 |
| 8,475,894 B2 | 7/2013 | Noble et al. | |
| 8,512,498 B2 | 8/2013 | Belanger et al. | |
| 2002/0185063 A1 | 12/2002 | Kuang-Wen | |
| 2005/0241267 A1 | 11/2005 | Wu | |
| 2006/0060264 A1 | 3/2006 | Glover et al. | |
| 2006/0174975 A1 | 8/2006 | Wan et al. | |
| 2008/0000547 A1 | 1/2008 | Barker et al. | |
| 2010/0015420 A1 | 1/2010 | Riebel et al. | |
| 2010/0078985 A1 | 4/2010 | Mahoney et al. | |
| 2013/0001827 A1 | 1/2013 | Trost et al. | |
| 2016/0288880 A1 | 10/2016 | Eckstein et al. | |

OTHER PUBLICATIONS

Requisition by the Canadian Examiner of priority application dated Feb. 3, 2017, 3 pages; plus Examination Search Report, 3 pages.
Canadian Examiner's Requisition dated Aug. 7, 2017 (dated Aug. 7, 2017)—3 pages; and Examination Search Report—1 page.

* cited by examiner

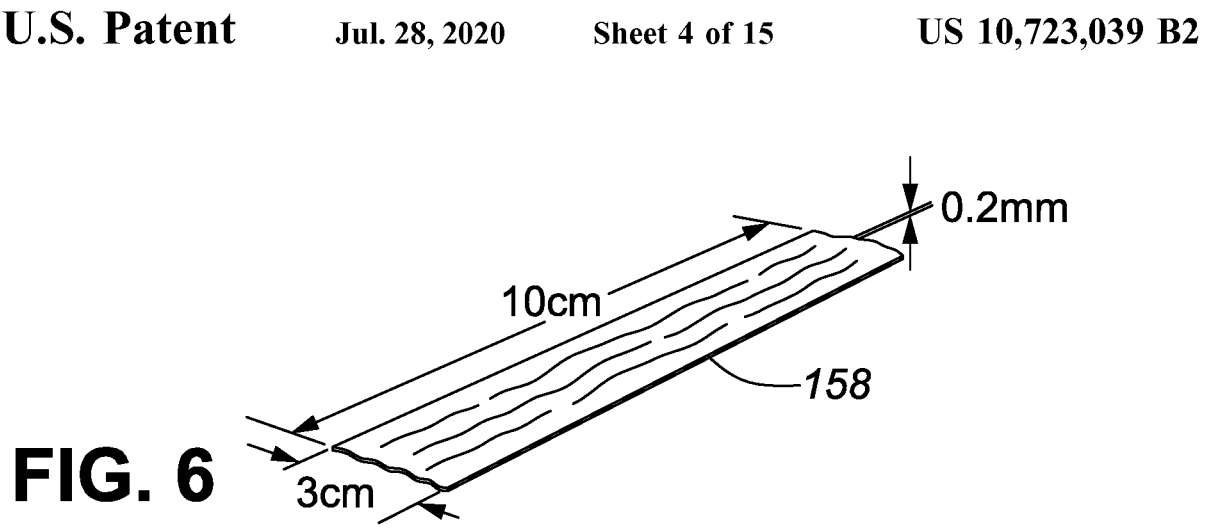
FIG. 6
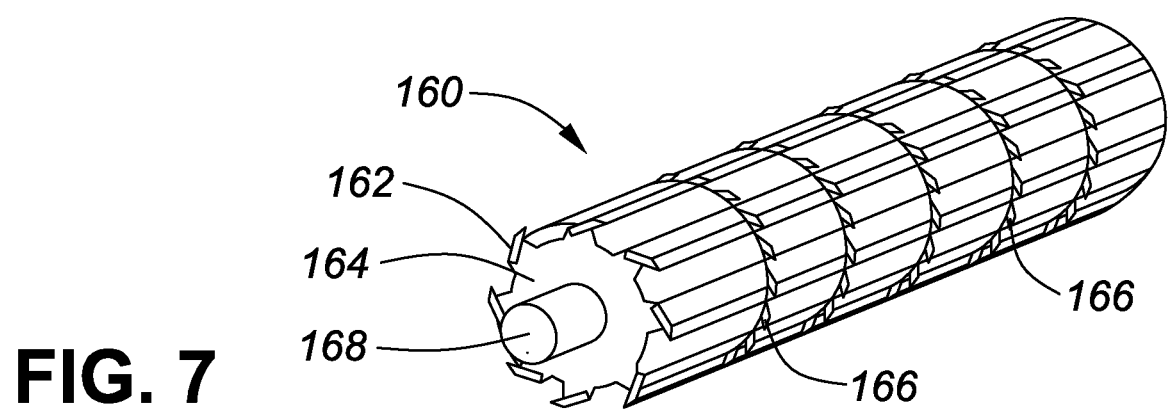
FIG. 7
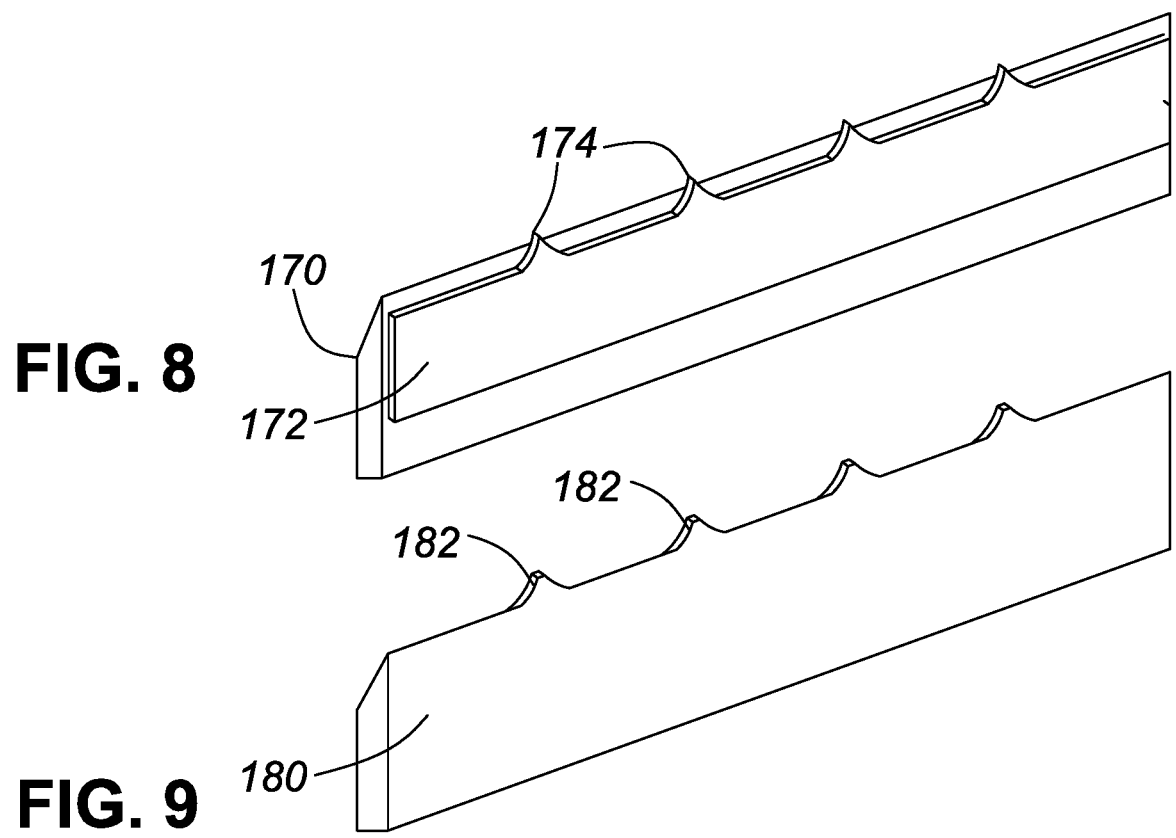
FIG. 8
FIG. 9

COMPOSITE WOOD PANELS WITH CORRUGATED CORES AND METHOD OF MANUFACTURING SAME

FIELD OF THE INVENTION

This invention relates in general to composite wood panels and, in particular, to novel composite wood panels with corrugated cores and, methods of manufacturing same.

BACKGROUND OF THE INVENTION

There is a long history of creating composite wood panels and structural members from wood materials unsuitable for peeler logs or dimensional lumber.

Such composite wood panels include: hard board, flake board, strand board, oriented strand board, wafer board, particle board, etc. Each of these composite wood panels has its respective method(s) of manufacture, strength characteristics and potential uses.

Wood flakes, strands and wafers for composite wood panels are frequently crosscut, i.e. cut across the wood grain so the grain runs lengthwise through the flake, strand or wafer. Many machines for cutting wood into flakes, strands and wafers are known and described in the prior art. Examples include ring flakers, disk flakers and drum flakers. Wood flakes, strands and wafers made with those machines are suitable for making prior art composite wood panels, but the flakes, strands and wafers do not have a consistent thickness, length or width. To improve dimensional consistency, the use of screens and cyclone separators have been used. However, neither of these methods ensures a high degree of dimensional consistency.

There have also been attempts made to increase a flexural strength of composite wood panels. For example, U.S. Pat. No. 4,675,138 teaches a method of manufacturing a corrugated wafer board in a single stage process using a convertible platen that morphs from a flat to a corrugated configuration.

Structural members of composite wood material have also been invented and are described, for example, by U.S. Pat. No. 4,241,133, which uses wood flakes cut using a round wood flaker or a helical comminuting shear to create fingerlings flaked in a ring-type flaker.

Wood pulp slurries have likewise been used to manufacture corrugated cardboard and structural panels. Published U.S. Patent Application 2010/0078985A1 teaches a honeycomb-shaped structural panel formed from a plurality of generally sinusoidally shaped strips molded, from a wood pulp slurry.

In spite of a long history of development, composite wood panels are heavier, less flex resistant and more susceptible to moisture intrusion than plywood or solid wood. There therefore remains a need for a strong, low density composite wood panel with a corrugated core, and a method of manufacturing same.

SUMMARY OF THE INVENTION

It is therefore an object of the invention to provide a strong, light-weight, low density composite wood panel with a corrugated core, and a method of manufacturing same.

The invention therefore provides a composite wood panel comprising a thin, pliable cold rolled stock having a thickness of 0.5 mm-1.0 mm, the cold rolled stock consisting of wood laminae having a length of at most 150 mm, a width of at most 50 mm, and a thickness of at most 0.5 mm, the wood laminae all having a variation in length of at most 5%, a variation in width of at most 10%, and a variation in thickness of at most 5%, the laminae being randomly oriented in the cold rolled stock and adhered together by a cold set adhesive.

The invention further provides a method of manufacturing a composite wood panel, comprising steps, of cutting wood laminae having a length of about 75 mm-150 mm, a width of about 10 mm-50 mm, and a thickness of about 0.25 mm-2.5 mm; drying the wood laminae to about 10% moisture content; sorting the wood laminae so that all wood laminae for the composite wood panel have dimensions within a tolerance of 5% in length and thickness and a tolerance of 10% in width; applying a cold set adhesive to the wood laminae; forming the wood laminae into a mat of randomly oriented wood laminae, the mat having a thickness adequate to produce a cold rolled stock of 0.5 mm-3 mm; and cold rolling the mat to form the cold rolled stock.

The invention yet further provides a method of manufacturing a composite wood panel, comprising steps of: cutting wood laminae having a length of about 75 mm-150 mm, a width of 10 mm-50 mm, and a thickness of 0.25 mm-2.5 mm; drying the wood laminae to about 10% moisture content; sorting the wood laminae so that all wood laminae for the composite wood panel have dimensions within a tolerance of 5% in length and thickness and a tolerance of 10% in width; applying a hot set adhesive to the wood laminae; applying a cold set adhesive to the wood laminae; forming the wood laminae into a mat of randomly oriented wood laminae, the mat having a thickness adequate to produce a cold rolled stock of 0.5 mm-3 mm; and cold rolling the mat to form the cold rolled stock.

The invention yet further provides a composite wood panel comprising a cold rolled stock having a thickness of 1 mm-3 mm, the cold rolled stock consisting of wood laminae having a length of about 75 mm-150 mm, a width of 10 mm-50 mm, and a thickness of 0.25 mm-0.3 mm, the wood laminae all having dimensions within a tolerance of 5% in length and thickness and a tolerance of 10% in width, and the laminae being randomly oriented in the cold rolled stock and adhered together by a hybrid adhesive blend.

The invention yet further provides a method of manufacturing a composite wood panel, comprising steps of: cutting wood laminae having a length of about 75 mm-150 mm, a width of 10 mm-50 mm, and a thickness of 0.25 mm-2.5 mm; drying the wood laminae to about 10% moisture content; sorting the wood laminae so that all wood laminae for the composite wood panel have a target dry weight; applying hybrid adhesive blend to the wood laminae; forming the wood laminae into a mat of randomly oriented wood laminae, the mat having a thickness adequate to produce a cold rolled stock of 0.5 mm-3 mm; and cold rolling the mat to form the cold rolled stock.

The invention yet further provides a composite wood panel with a corrugated core comprising opposed face panels and a corrugated core panel interleaved with the opposed face panels and, bonded thereto, the face panels and the core panel comprising a cold rolled stock having a thickness of 1 mm-3 mm, the cold rolled stock consisting of wood laminae having a length of about 75 mm-150 mm, a width of 10 mm-50 mm, and a thickness of 0.25 mm-0.3 mm, the wood laminae in any one of the face and core panels all having dimensions within a tolerance of 5% in length and thickness and a tolerance of 10% in width, and the laminae being randomly oriented in the cold rolled stock and adhered together by a cold set, adhesive.

The invention yet further provides a composite wood pan& with a corrugated core comprising opposed face panels and a corrugated core panel interleaved with the opposed face panels and bonded thereto, the face panels and the core panel comprising a cold rolled, heat set stock having a thickness of 1 mm-3 mm, the cold rolled, heat set stock consisting of wood laminae having a length of about 75 mm-150 mm, a width of 10 mm-50 mm, and a thickness of 0.25 mm-0.3 mm, the wood laminae in any one of the face and core panels all having dimensions within a tolerance of 5% in length and thickness and a tolerance of 10% in width, and the laminae being randomly oriented in the cold rolled, heat set stock and adhered together by a hybrid adhesive.

The invention yet further provides a composite structural wood panel with a corrugated core having flat-topped crests comprising opposed face panels with a corrugated core panel with the flat-topped crests interleaved with the opposed face panels and bonded thereto, the face panels and the core panel comprising a cold rolled, heat set stock having a thickness of 1 mm-3 mm, the cold rolled, heat set stock consisting of wood laminae having a length of about 75 mm-150 mm, a width of 10 mm-50 mm, and a thickness of 0.25 mm-0.3 mm, the wood laminae in any one of the face and core panels all having dimensions within a tolerance of 5% in length and thickness and a tolerance of 10% in width, and the laminae being randomly oriented in the cold rolled, heat set stock and adhered together by a hybrid adhesive.

BRIEF DESCRIPTION OF THE DRAWINGS

Having thus generally described the nature of the invention, reference will now be made to the accompanying drawings, in which:

FIG. 6 is a schematic perspective view of the lamina shown in FIG. 5;

FIG. 7 is a schematic perspective view of a segmented cutter head for cutting laminae in accordance with the invention;

FIG. 8 is a schematic perspective view of a blade arrangement for cutting laminae in accordance with the invention;

FIG. 9 is a schematic perspective view of another blade arrangement for cutting laminae in accordance with the invention;

DETAILED DESCRIPTION OF THE PREFERRED EMBODIMENTS

The invention provides a novel composite wood panel manufactured using a cold press adhesive applied to wood laminae cut to exacting specifications. In one embodiment, a hybrid adhesive blend of a cold set adhesive and a heat set adhesive is applied to the wood laminae before they are cold pressed. The composite wood panel can be quite thin and very flexible, permitting the panel to be corrugated to provide cores for corrugated-core composite wood panels useful in packaging and structural applications. The composite wood panels are cold rolled and heat pressed for strength and a permanent set after cold pressing and optional corrugation. Two or more of the corrugated core panels or face panels, may be laminated together to provide strong, laminated corrugated core panels or laminated face panels for packaging or structural applications. A heat set adhesive may be applied between the laminations to enhance interlamination bonding. The structural panels have corrugated cores with flat crests that provide additional adhesive area for bonding the cores to the face panels. Two or more corrugated cores may be interleaved between flat face panels to provide composite wood panels and structural composite wood panels having extra strength and rigidity.

Figure 1:
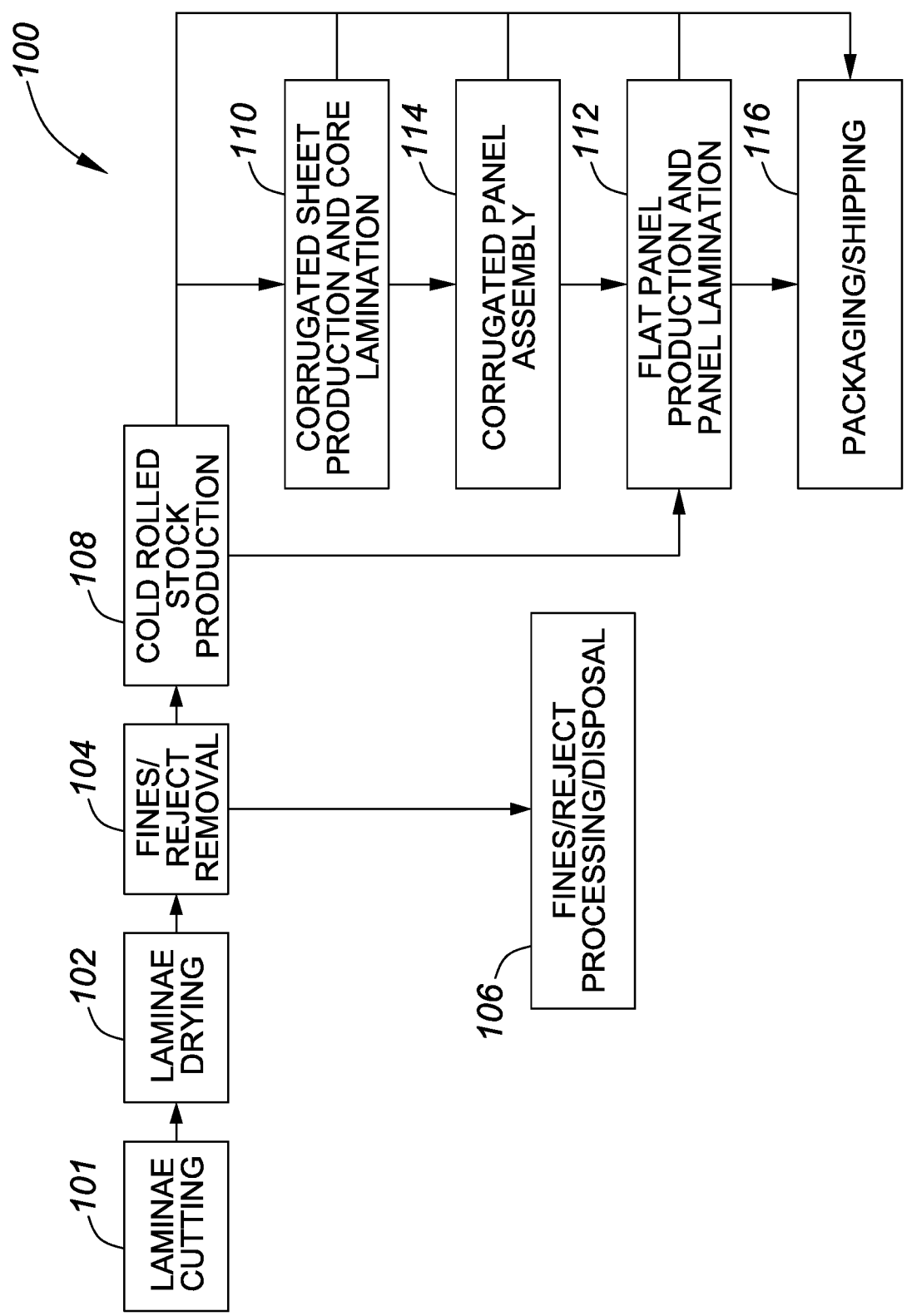
FIG. 1 is a block diagram of an overview of a process for manufacturing composite wood panels in accordance with the invention.

FIG. 1 is a block diagram of an overview of a process 100 for manufacturing composite wood panels in accordance with the invention. The process begins with wood laminae cutting 101. Wood panels in accordance with the invention are manufactured using wood "laminae" (plural of "lamina"). The term wood laminae, hereinafter simply laminae, is used to distinguish from wood strands, flakes, chips and wafers described in the prior art. The laminae are cut from green logs, as are wood strands, flakes, chips and wafers. However, the laminae differ from wood strands, flakes, chips and wafers in two important aspects. First, the laminae are cut using a cutter head that supports a cutter blade at a novel rake angle, and the cutter blade is ground to a more acute cutting angle than are prior art chipper blades, as will be explained below in detail with reference to FIGS. 2-6. Second, the dimensions of the laminae are carefully controlled to ensure that every lamina in a composite wood panel manufactured in accordance with the invention has essentially the same dimensions as every other lamina in the panel. Preferably, the length and width of each lamina differs by less than 10%, and the thickness varies at most by ±0.05 mm (0.002"). This permits the manufacture of very thin composite wood panel stock (0.5 mm-1.5 mm) from cold pressed mats. The cold pressed composite wood panel stock may be handled, cut into sheets, rolled into rolls, and optionally stored for further processing into flat or corrugated composite wood panels. The flat and the corrugated composite wood panels are hot pressed for a final set that adds strength and rigidity to the composite wood panels. Thicker composite wood panels can be made using the same process. Preferably, the cold pressed thickness of the composite wood panels does not exceed 3 mm, so that hot pressing can be accomplished at lower press temperatures and shorter press times.

Once reheated, the thin (0.5 mm-1.5 mm) composite wood panel stock is pliable enough to be corrugated much like craft paper. The flat composite wood panels and the corrugated composite wood panels can be glued together to make lightweight packaging and construction products that have performance and endurance characteristics that are far superior to wood slurry products.

The laminae may be cut from a variety of solid wood sources. The laminae are best cut from freshly harvested wood with a high moisture content. Low grade wood, such as fire wood grade, pulp grade or random grade wood may be used. High grade logs are best saved for plywood and dimensional lumber. For very thin laminae, wood species having a "difuse-porus" structure produce the best results. Aspens, maples, beeches, alders and birches produce superior laminae in thicknesses under 0.30 mm (0.012"). For laminae of 0.30 mm and greater, ring porous hardwood species such as oaks, elms, ashes and exotic hardwoods are suitable. Conifers may also be used for laminae of 0.30 mm, or greater.

The raw wood material may be harvested, transported and handled using conventional techniques. Any raw wood diameter greater than about 7.6 cm (3") is suitable. The raw wood must be debarked before the wood laminae are cut. Debarking may be accomplished using any known equipment including, but not limited to, ring debarkers, drum debarkers, rosserhead debarkers or chain-flail debarkers. The raw wood may be cut to appropriate length for laminae cutting before or after debarking.

The debarked wood may be steam heated or soaked in a hot water bath to facilitate cutting. Preheating is especially desirable if the ambient temperature is below freezing. Preheating is also desirable before processing coarse grained species. The "diffuse-porous" species mentioned above can generally be cut without preheating if the ambient temperature is above freezing.

After the laminae are cut, they must be dried. Laminae drying 102 should occur fairly soon after cutting, or the lamina will stick together and begin to mold when ambient temperatures are warm, or freeze into clumps if ambient temperatures are below freezing. Drying can be accomplished using known equipment, including drum dryers, belt driers and microwave driers, all of which are known in the art. In one embodiment, a multi layered belt drier is used. Temperatures inside the belt drier are maintained at around 40° C.-95° C. The belts are porous and up to 2 meters wide. Bark from the debarking machine(s) is burned in a chain grate furnace and hot air is ducted from a heat exchanger above the furnace to the belt dryer. The belt dryer is enclosed and has exhaust ducts to carry away the moist air. The speed of the belt drive is adjusted to regulate the moisture in the laminae to a target moisture content as they exit the dryer, generally about 4%-12% by weight, to enhance the bond strength of most adhesives. Some advanced adhesives permit a higher moisture content in the laminae, as understood by those skilled in the art.

After the laminae are dried to the target moisture content they are conveyed to fines/reject removal 104, which will be explained in more detail below with reference to FIG. 12. Laminae for composite wood panels in accordance with the invention must be precisely cut so that they are consistent in thickness, length and width. Cutting laminae generates a certain amount of fines, as will be explained below with reference to FIGS. 9-11. Log ends, knots, voids and other defects cause underweight laminae. Furthermore, when nearly all of a log has been cut into laminae the last few cuts generally produce irregularly shaped or thick pieces. Fines/reject removal 104 removes all fines as well as all under/overweight lamina bits.

Fines/Reject processing/disposal 106 processes or dispones of the fines and any underweight/overweight lamina bits. Wood dust, collected from enclosed sorting screens and separated from collection air in a cyclone separator, is known as wood flour and can be sold as an additive that is mixed with injection molded plastics. The Wood fines, which fall through sorting screens and are collected in a fines chute, make ideal pellet stock and can be pelletized and burned with the bark fuel, or packaged and sold as fuel pellets. There is a small volume of underweight/overweight lamina bits, and those are conveniently added to the bark fuel. If there is a surplus of bark fuel, the underweight/overweight bits can be ground, added to the fines, and pelletized since they are at an ideal moisture content.

The laminae stream exiting the Fines/Reject Removal process 104 is conveyed to Cold Rolled Stock Production 108, which will be explained below in detail with reference to FIGS. 13a-c. Output of the cold rolled stock production 108 may be routed to any one of Corrugated Sheet Production and Core Lamination 110; Flat Panel Production and Panel Lamination 112, or Packaging/Shipping 116, depending on the thickness of the cold rolled stock, market demand, production capacity and other factors. Corrugated Sheet Production and Core Lamination 110 will be explained in detail below with reference to FIGS. 14a and 14b. Flat panel production 112 will be explained in detail below with reference to FIG. 15.

The output of the Corrugated Sheet Production and Core Lamination 110 may be passed directly to Corrugated Panel Assembly 114, which is explained in detail below with reference to FIGS. 18-21, or Packaging/Shipping 116 where corrugated sheets are packaged and shipped for assembly into panels elsewhere, or for use in other products/processes.

The output of Flat Panel Production and Panel Lamination 112 may be passed directly to Corrugated Panel Assembly 114 or passed directly to Packaging/Shipping 116, where the flat panels are packaged and shipped for assembly into corrugated panels elsewhere, for use in other products/processes, or for direct use as sheathing, etc. in the building trades.

The output of Corrugated Panel Assembly 114 goes to Packaging/Shipping 116, where it is packaged and shipped to wholesalers and/or retailers for distribution to the packaging and/or construction trades.

Figure 2:
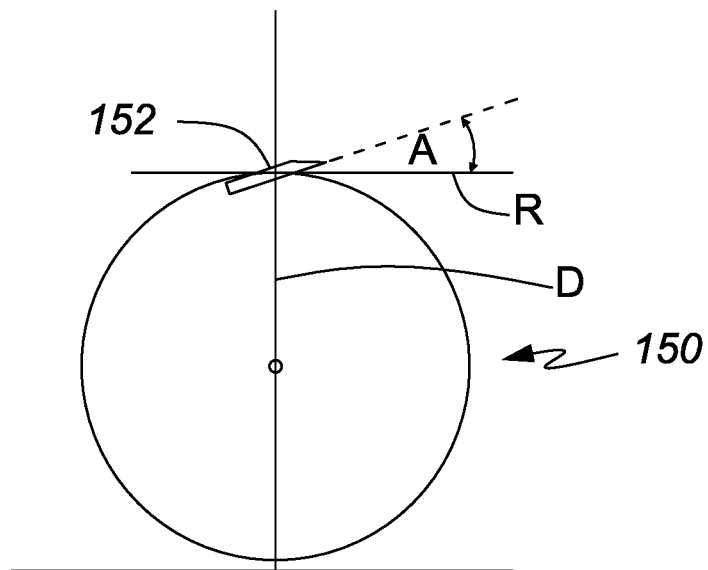
FIG. 2 is a schematic diagram of a cutter head suitable for cutting laminae for use in manufacturing composite wood panels in accordance with the invention.

FIG. 2 is a schematic diagram of a cutter head 150 that supports a cutting blade 152 at an axial rake angle 'A' suitable for cutting laminae for use in manufacturing composite wood panels in accordance with the invention. The cutting blade 152 is affixed to the cutter head 150 in a manner well known in the art, using machine screws, for example, as understood by those skilled in the art. The "axial rake angle" of the cutting blade 152 is an offset of a bottom edge of the cutting blade 152 from an imaginary line 'R' that extends at a right angle with respect to a diameter 'D' of the cutter head 150 that passes through a center of the cutting blade 152. The axial rake angle 'A' is 20°-35°, preferably 20°-25°. The cutter head 150 is shown with only one blade 152 for simplicity of illustration. The cutter head 150 is preferably provisioned with as many cutting blades 152 as practical since the number of cutting blades 152 and the rotation rate of the cutter head 150 determines a rate at which wood can be fed to the cutter head 150, as will be explained below in more detail with reference to FIG. 4.

Figure 3:
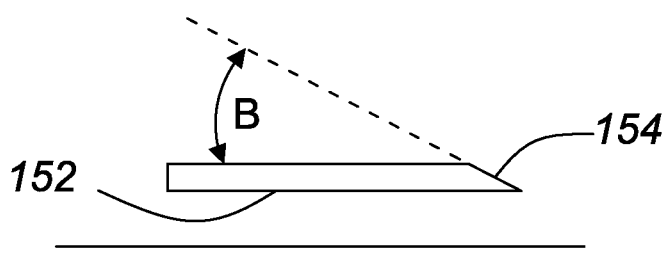
FIG. 3 is a schematic diagram of a blade angle for knives of the cutter head shown in FIG. 2.

FIG. 3 is a schematic diagram of a blade angle 'B' for cutting blades 152 of the cutter head 150 shown in FIG. 2. The blade angle 'B' is the angle of the ground cutting edge 154 with respect to a top side of the cutting blade 152. The blade angle 'B' is 20°-30°, preferably 20°-25°.

Figure 4:
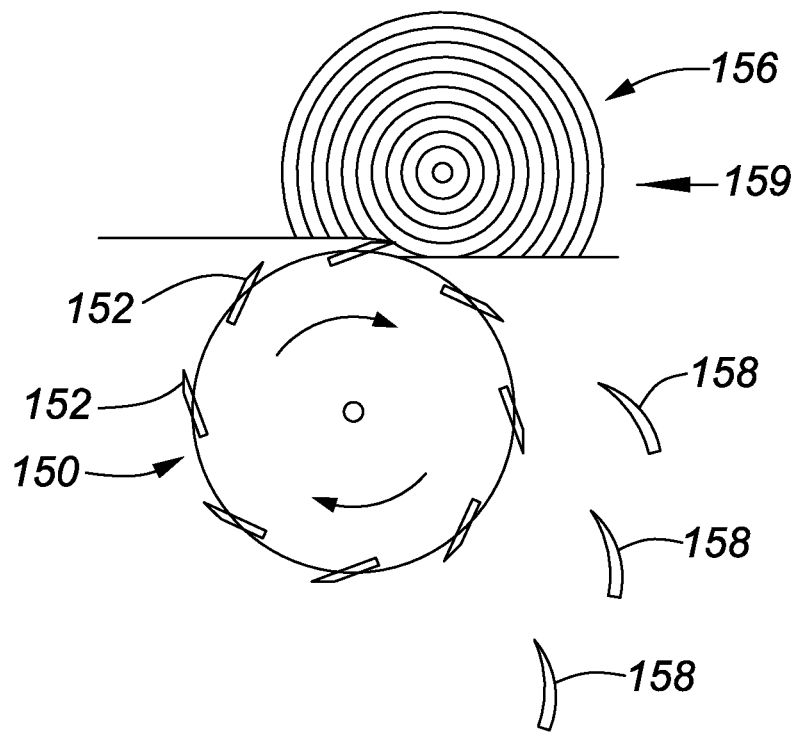
FIG. 4 is a schematic-cross sectional diagram of the cutter head shown in FIG. 2 cutting laminae in accordance with the invention.

FIG. 4 is a schematic-cross sectional diagram of the cutter head 150 shown in FIG. 2 cutting a log 156 into laminae 158 in accordance with the invention. The log 156 is fed 159 into the cutter head 150 at a predetermined rate that cuts laminae 158 of a desired thickness. The desired laminae thickness depends on what will be produced from the laminae 158, as will be explained below in detail with reference to FIGS. 13-15. As the cutter head 150 rotates clockwise into the log 156, each blade 152 cuts one lamina 158. If the log 158 is free of defects, each lamina will have the desired dimensions so long as a rate of feed 159 is constant.

Figure 5A:
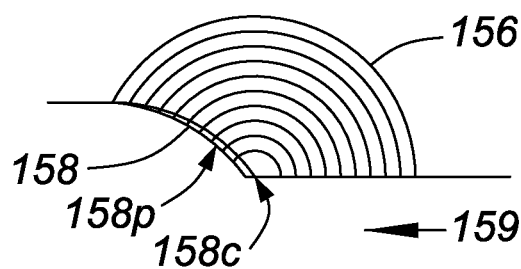
FIG. 5*a* is a schematic cross-sectional diagram of a lamina in accordance with the invention before it is cut from a log.

FIG. 5a is a schematic cross-sectional diagram of one of the laminae 158 before it is cut from the log 156. The reference number 158p indicates a schematic illustration of the precut surface of the log 156. The reference number 158c indicates a schematic illustration of the path of a tip of a cutting blade 152 as it is driven through the log 156 to cut the lamina 158.

Figure 5B:
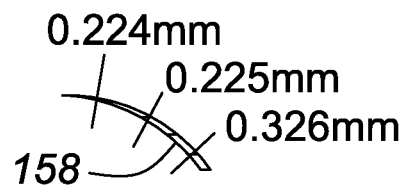
FIG. 5*b* is a schematic end elevational view of the lamina shown in FIG. 5*a* after it has been cut from the log.

FIG. 5b is a schematic end elevational view of the lamina 158 shown in FIG. 5a after it is cut from the log 156. As can be seen, the thickness of the lamina 158 increases from the beginning of the cut on the left hand side of the diagram to the end of the cut on the right hand side of the diagram. In this example, the lamina 158 is about 0.224 mm (0.009") at the beginning of the cut, 0.225 mm (0.01") in the middle of the cut and 0.326 mm (0.013") on the end of cut side. For the sake of simple reference hereinafter, the thickness of a lamina 158 is its thickness in the middle of the cut, rounded to one decimal point. In this example, the lamina is 0.2 mm (0.01') thick.

FIG. 6 is a schematic perspective view of one example the wood lamina 158 shown in FIG. 5. As can be seen, the lamina 158 is about 10 cm (4") long, 3 cm (1¼") wide and 0.2 mm (0.01") thick. For the purposes of the invention, the dimensions for laminae 158 are between 75 mm and 150 mm (3"-6") in length, between 10 mm and 50 mm (0.4"-2") in width, and between 0.25 mm and 2.5 mm (0.01"-0.1") in thickness. The most useful dimensions for laminae 158 is between 10 cm and 15 cm (4"-6") in length, between 1 cm and 2.5 cm (0.4"-1") in width, and between 0.25 mm and 0.76 mm (0.01"-0.03") in thickness. Laminae 158 thinner than about 0.25 mm (0.01") are too flimsy and split lengthwise too readily. Laminae thicker than about 0.03" become too stiff and are difficult to press into a void-free stock. Importantly, the lamina 158 for any particular use should all have the same dimensions within a tolerance of 5% in length and thickness and a tolerance of 10% in width. Uniform dimensions of the laminae 158 is particularly beneficial if the laminae 158 are to be oriented and singulated, as will be described below with reference to FIG. 13a. All laminae 158 outside those tolerances are sorted out and discarded as will be explained below with reference to FIG. 12.

FIG. 7 is a schematic perspective view of a segmented cutter head 160 for cutting wood laminae 158 in accordance with the invention. A plurality of cutting blades 162 are respectively affixed to a plurality of cutter head segments 164. The respective cutter head segments 164 are respectively interleaved by a saw blade 166 having an outer diameter slightly larger than a circle defined by an outer cutting, edge of the respective cutting blades 162. The cutter head segments 164 and the saw blades 166 are held in juxtaposition by a drive shaft 168 that is connected to a power source to turn the segmented cutter head 160 at a predetermined rate, Each cutter head segment 164 has a length equal to a desired length of the wood lamina 158 to be cut (10 cm (4"), for example). The respective saw blades 166 pre-score a log being cut so that all laminae 158 have exactly the same length when there are no defects in the log.

FIG. 8 is a schematic perspective view of a blade arrangement for cutting laminae in accordance with the invention. The blade arrangement shown in FIG. 8 provides an alternative to the segmented cutter head 160 shown in FIG. 7. Long cutting blades 170 having a length that extends across a wide cutter head (1.25 m (4'), for example) are backed by a scoring blade 172 having a plurality of scoring teeth 174. The scoring teeth 174 are spaced apart from tip to tip the desired length of a laminae (10 cm (4"), for example), The scoring blade 172 is captured between the cutter head (not shown) and the cutting blade 170 and cannot move when the cutting blade 170 is affixed to a cutter head. As the cutter head rotates, the scoring teeth pre-score the log before the cutting blade 170 cuts a next group of laminae 158 from the log 156. The scoring teeth 174 extend above the cutting blade 170 at least as far as the thickest part of the laminae 158 to be cut. Thus the single blade 170 cuts a plurality of laminae 158 in a single pass and each one is the same length as all the others, assuming that there are no defects in the log being cut.

FIG. 9 is a schematic perspective view of another blade arrangement 180 for cutting laminae in accordance with the invention. This blade arrangement works on the same principle as the blade arrangement described above with reference to FIG. 8 except that scoring teeth 182 are an integral part of the cutting blade 180. This simplifies setup at the expense of complicating sharpening of the cutting blade 180.

Figure 10:
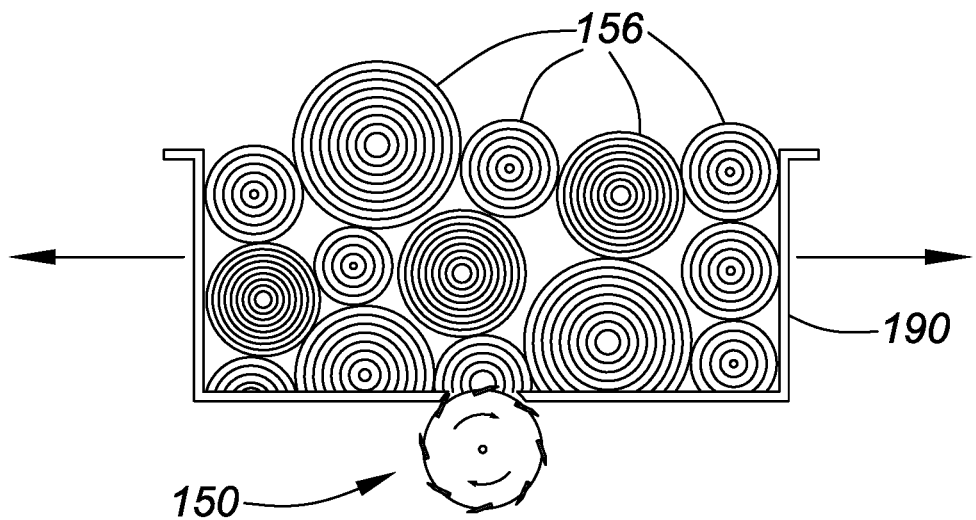
FIG. 10 is a schematic cross-sectional diagram of a first machine for cutting laminae from green logs.

FIG. 10 is a schematic cross-sectional diagram of a first cutting, machine 190 for cutting wood laminae accordance with the invention. A plurality of logs 156 are loaded in a log hopper 190 and the log hopper 190 is reciprocated over the cutting head 150 at a predetermined rate that will cut laminae 158 of a desired thickness. The cutter head 150 is at least as long as the log hopper 190 is wide, so that a full length of each log 156 is cut at the same time. The log hopper 190 may be reciprocated by any conventional means, for example by one or more hydraulic cylinders (not shown) as taught by Clark et al. in U.S. Pat. No. 2,698,092 which issued on Sep. 14, 1954. The log hopper 190 is kept full of logs 156 to ensure that the bottom logs are held in place and do not shift during laminae cutting.

Figure 11:
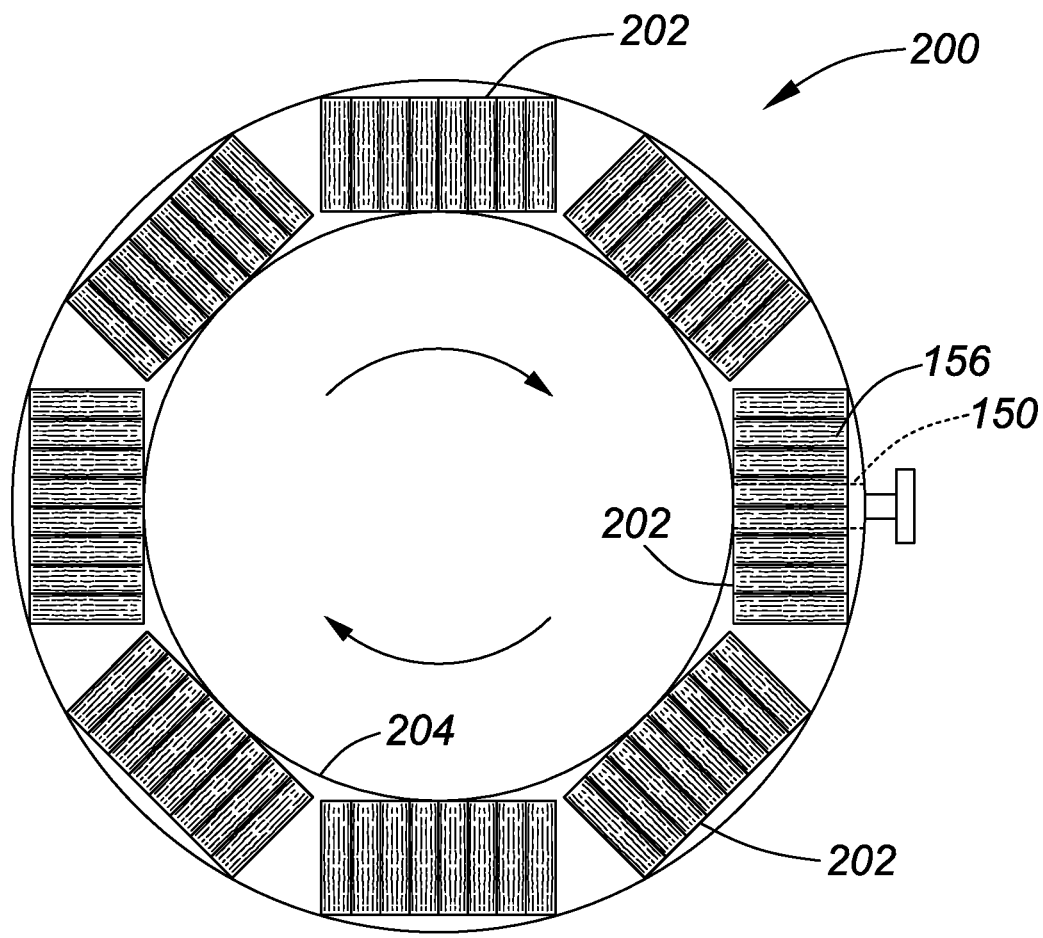
FIG. 11 is a schematic top plan view of another machine for cutting laminae from green logs.

FIG. 11 is a schematic top plan view of another cutting machine 200 for cutting wood laminae 158 in accordance with the invention. The cutting, machine 200 is capable of high volume production of wood laminae 158. A plurality of log hoppers 202 are supported on a circular track 204, similar to one taught in U.S. Pat. No. 6,152,200 which issued to Smothers on Nov. 28, 2000. Unlike the machine taught by Smothers, logs 156 are laid crosswise in the log hoppers 202 so they are lengthwise parallel to one or more long cutting heads 150 that are affixed to the circular track 204 and span a width of each log hopper 202. The circular track 204 has a large enough diameter that, at any given time, the logs 156 in each log hopper 202 remain substantially parallel to the cutting head 150 over which they are passing. This ensures that the grain in each lamina 158 cut from each log 156 runs a full length of the lamina 158. The log hopers 202 are urged over the track in a clockwise direction using, for example, a hydraulic drive mechanism taught by Smothers.

Figure 12:
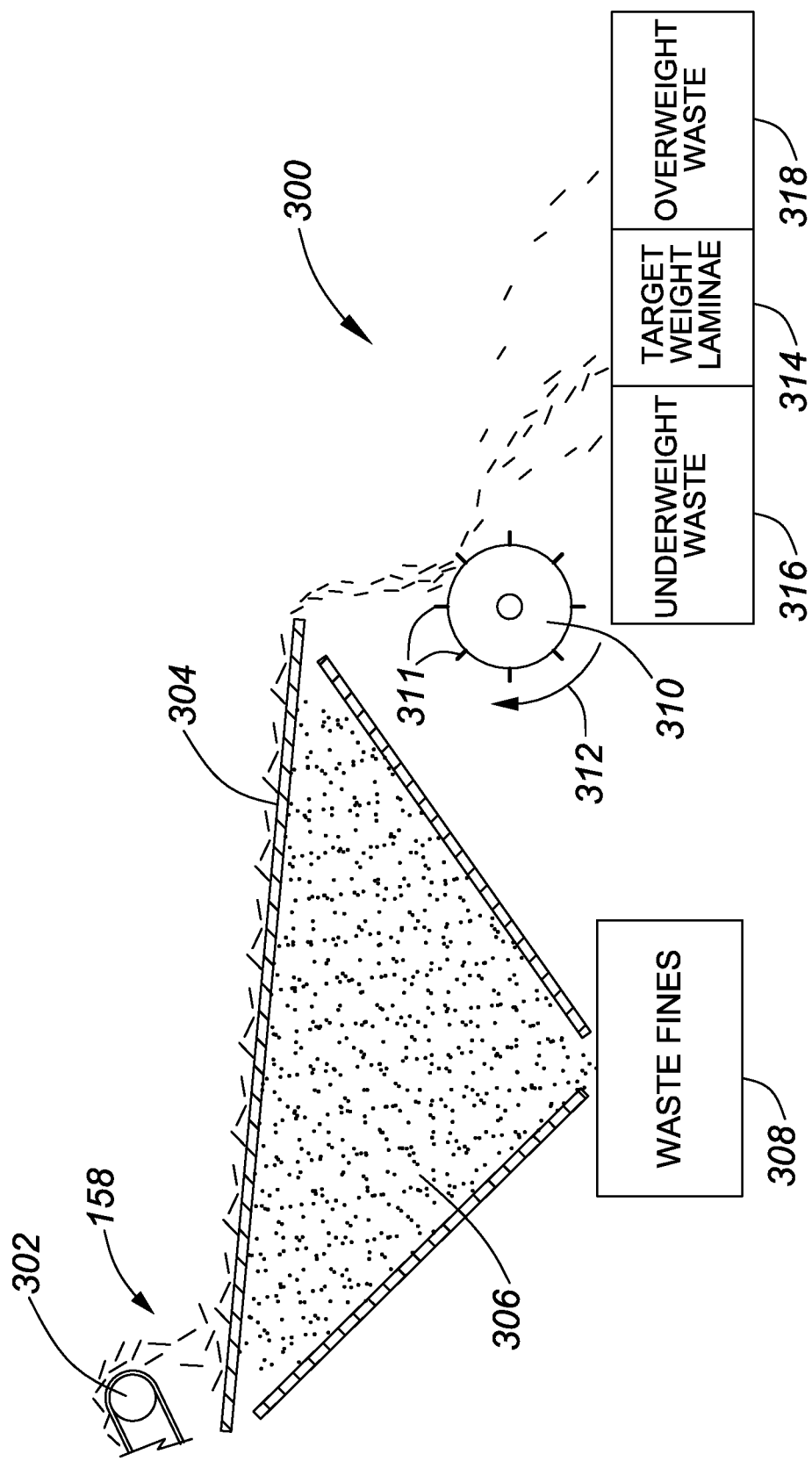
FIG. 12 is a schematic diagram of an inertia sorter for sorting laminae cut in accordance with the invention.

FIG. 12 is a schematic diagram of an inertia sorter 300 for sorting dry laminae 158 cut in accordance with the invention. As explained above, the lamina 158 for any particular use should all have the same dimensions within a tolerance of 5% in length and thickness and 10% in width. In one embodiment, sorting usable laminae 158 from a laminae stream exiting the laminae dryer (not shown) is shown using the inertia sorting system 300. Laminae 158 exiting the dryer at the target moisture content is conveyed 302 to one or more reciprocating screen(s) 304 that remove dust and fines created by cutting scoring blades and any short or overly narrow lamina pieces. In one embodiment, the reciprocating screen(s) 304 are enclosed in a dust collection hood (not shown), and wood dust, also called wood flour, from the dried laminae 158 is ducted away and separated from exhaust air by a cyclone separator (riot shown). In many jurisdictions output air from the cyclone separator must be filtered, and more wood flour is collected from the air filters. Fines 306 falling through the reciprocating screen(s) 304 are funneled into a waste fines collector 308 where they are conveyed, for example by an auger, to a fines disposal/processing station (not shown).

Laminae 158 exiting the screen(s) 304 still contain underweight and overweight pieces which are typically too thin or too thick rather that too long or too wide. The laminae 158 exiting the screen(s) 158 are dropped onto a cylindrical inertia sorter 310, which is rotated clockwise at a predetermined rate 312 by a power source (not shown). The inertia sorter 310 sorts the laminae by weight rather than dimension, but the laminae 158 are within dimensional tolerances if the dry laminae 158 have a predetermined target weight. Paddles 311 that project from a surface of the cylindrical inertia sorter 310 propel the lamina stream out over the mouth of three collector chutes, a target weight laminae chute 314, and underweight waste chute 316 and an overweight waste chute 318. The underweight and overweight waste is conveyed to waste treatment/disposal, as explained above. The target weight laminae 158 are conveyed to Cold Rolled Stock production, which is explained below with reference to FIG. 13. All laminae 158 in a given "run" are cut to the same size. The length of a run is dependent on product demand, product in stock, etc. The predetermined rate of rotation 312 of the inertia sorter, or the location of the laminae chutes 314-318, is adjusted to propel laminae 158 cut to a different target thickness to the target weight laminate chute 314. Experience has shown that the inertia sorter system 300 sorts laminae 158 to the desired tolerance allowance of 5% in length and thickness and 10% in width.

In another embodiment, the cylindrical inertia sorter 310 is replaced by a high speed conveyor belt (not shown) which propels the laminae 158 in the same way to sort the target size laminae 158 form the underweight/overweight waste. The speed (meters/second) of the high speed conveyor belt, or the location of the laminae chutes 314-318, is adjusted whenever the target laminae size is changed.

In yet another embodiment, the cylindrical inertia sorter 310 is replaced by a high volume air stream (not shown) that propels the laminae 158 in the same way to sort the target size laminae 158 from the underweight/overweight waste. The speed (meters/second) of the high volume air stream, or the location of the laminae chutes 314-318, is adjusted whenever the target laminae size is changed.

Figure 13A:
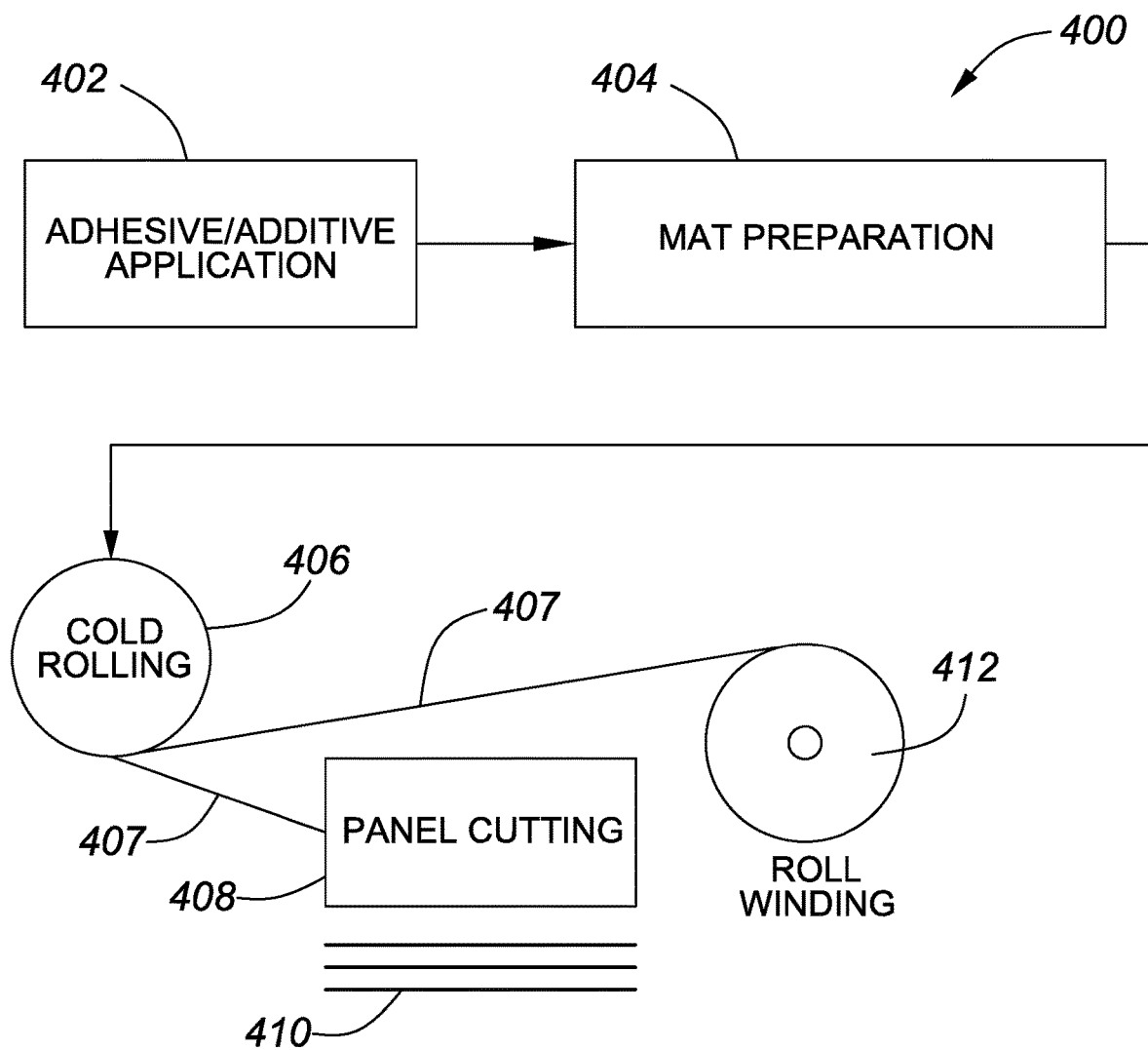
FIG. 13*a* is a block diagram of a method for manufacturing cold rolled stock in accordance with the invention.

FIG. 13*a* is a block diagram of a method 400 for manufacturing cold rolled stock in accordance with the invention. Lamina 158 entering the target size laminae chute 314 (see FIG. 12) are ready to be processed into cold rolled stock in accordance with the invention.

Accordingly, the laminae 158 are first conveyed (conveyors rather than air handlers are preferred to ensure that the laminae 158 are not broken or split passing through a blower(s)) to an adhesive/additive application system 402. It is important that both sides of each lamina 158 is coated with adhesive. This can be accomplished in at least three different ways: 1) the laminae 158 may be conveyed over the mat web after being oriented and, singulated and allowed to drop through a series of pairs of misting tubes that spray adhesive(s) and additive(s) in a predetermined sequence to each side of each lamina 158, as described below with reference to FIG. 13*b*; 2) the laminae 158 can be batch processed in a drum blender where adhesive and additives are applied in a predetermined sequence, as described below with reference to FIG. 13*c*; or, 3) the laminae 158 can be batch processed in a drum blender where certain adhesive(s) and additives are applied in a predetermined sequence, then the laminae 158 are released from the drum blender and oriented using a strand orientor well known in the art, singulated (using an adaptation of a singulator conveyor system taught, for example, by Okada et al. in U.S. Pat. No. 5,769,204), and then laminae 158 are allowed to drop between opposing pairs of misting tubes that respectively mist a different adhesive and/or additive(s) onto each side of each lamina 158, which is a hybrid of the systems shown in FIGS. 13*b* and 13*c*.

In accordance with the invention, a cold set adhesive must, be applied to each side of each lamina 158. One cold set adhesive that has proven effective is polyvinyl acetate (PVAc), well known and widely used as a wood adhesive. In one embodiment, composite wood panels for light to medium duty packaging and the like may be manufactured using neat PVAc at, for example, about 4%-10% by weight of the laminae 158. Other cold set adhesives and variants of polyvinyl acetate may also be used.

In another embodiment, strength and durability of the composite wood panels, in accordance with the invention is enhanced using a hybrid adhesive system consisting of a cold set adhesive and a hot set adhesive. One such hybrid adhesive system is a combination of phenol formaldehyde (PF) resole resin and PVAc in a PF/PVAc ratio of about 1.7/1.0, described by Yang Cao in a thesis submitted in partial fulfillment of the requirements for the degree of Master of Science in Civil Engineering, Washington State University, entitled Characterization Of PF/PVAc Hybrid Adhesive-Wood Interaction And Its Effect On Wood Strand Composites Performance, 2010, Other hybrid adhesive systems may also be used.

If the PF/PVAc hybrid adhesive system is used, Cao teaches that it is best to apply the PF before the PVAc. This can be accomplished using any of the three methods of applying adhesive described above. In a drum blender, the PF is applied first, in either dry powder or water emulsion form. The PVAc is applied before other additives such as wax for waterproofing in an amount of up to 5% by weight, insecticides and/or fungicides in an appropriate amount if the intended application of the composite wood panels warrants one or both. The PVAc is applied as a water emulsion using an appropriate dilution, generally about 40%-50% solids, before or after other additives are applied. In the drum blender, mist bar hybrid system, the PF is applied first in the drum blender. Any wax and other additives, if required, are added after the PF in the drum blender, and the PVAc is misted on as the singulated laminae 158 flutter down onto the mat web. In the mist bar system, a PF/water emulsion is the first mist applied to the laminae, followed by additives and PVAc in any desired order.

After adhesive/additive application, the laminae are ready for mat preparation 404. In the first method using the drum blender for adhesive application, any prior art apparatus for creating a strand mat can be employed to create a randomly oriented mat of laminae 158 in the required thickness to produce cold rolled stock in accordance with the invention. As noted above, the cold rolled stock in accordance with the invention is 0.5 mm-3 mm (0.02"-0.12") thick. If the cold rolled stock is to be corrugated, the cold rolled stock is preferably about 0.5 mm-1.5 mm (0.02"-0.06") thick. Using the second and third methods of adhesive application, the laminae 158 flutter down onto the mat web after they pass through the opposed pairs of mist bars and create a randomly oriented mat of laminae 158. The rate of travel of the mat web is controlled to achieve the required mat thickness in a manner well known in the art. Once the mat is prepared, the mat is conveyed to Cold Rolling 406. The "cold" rollers may be heated up to about 70° C. (158° F.) to drive off adhesive diluents. In one embodiment, the cold rollers consist of a first series of pinch rollers above the mat and a heated plate under the mat web to compress the mat to a cohesive web that is separated from the mat web and fed into a series of 4-10 opposed pairs of finish rollers that further compress the cold rolled stock to the desired thickness.

After leaving Cold Rolling 406, the cold rolled stock 407 may be directed to Panel Cutting 408 where it is cut into a desired panel length 410, employing a pneumatic shear well known in the art, for example. Alternatively, the cold rolled stock 407 can be wound onto spools 412 for storage, transport or further processing. As a further alternative, the cold rolled stock 407 may be fed directly to any one of the further processing methods described below with reference to FIGS. 14-15.

Figure 13B:
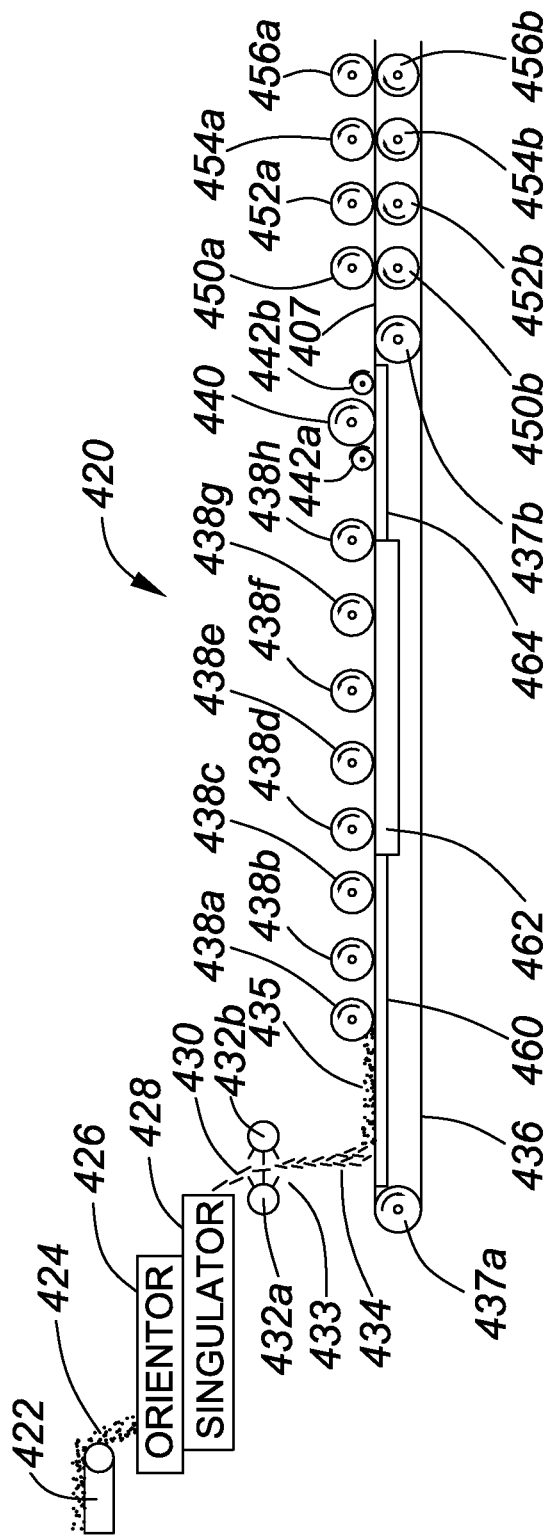
FIG. 13*b* is a schematic diagram of an exemplary apparatus for manufacturing cold rolled stock in accordance with the invention.

FIG. 13b is a schematic diagram of an exemplary apparatus 420 for manufacturing cold rolled stock 407 in accordance with the invention. A conveyor 422 moves laminae 424 from an inertia sorting system 300 (see FIG. 12) to a strand orientor 426 which orients all of the laminae in the same direction (lengthwise to the direction of travel). The oriented laminae are fed to a singulator 428 that arranges the oriented laminae into a single layer. The oriented, singulated laminae 430 are dropped between adhesive/additive mist bars 432a, 432b arranged in opposed pairs (only two are shown for sake of illustration). In one embodiment, one pair of mist bars 432a, 432b are provided for each adhesive and additive to be applied to the laminae 430. The pressure of fluid supplied to the mist bars is regulated, and the respective misting nozzles are selected, to ensure an appropriate rate of application of each adhesive and additive. After passing between the opposed pairs of mist bars 432a, 432b, the damp laminae 434 flutter down to form a random mat 435 on a mat web 436. In one embodiment, the mat web 436 is a steel conveyor belt about 3.94 m (100") wide turned in a clockwise direction by driven rollers 437a, 437b. A top of the steel conveyor belt 436 is supported by a rigid, planar unheated section 460, a rigid, planar heated section maintained at about 70° C. (158° F.), and a rigid, planar unheated section 464. The speed of the mat web 436 is regulated to ensure that the laminae mat 435 is of a required depth to form a cold rolled stock 407 of the desired thickness. As the mat 435 advances, a series of rollers 438a-438h compress the mat 435 against the mat web 436. A counter-rotating sanding drum 440 removes any high spots from the compressed mat. The counter-rotating sanding drum is flanked by rollers 442a, 442b to ensure that the sanding drum 440 does not buckle the compressed mat. After the compressed mat 407 is separated from the mat web 436, it is further smoothed and compressed by pairs of pinch rollers 450a,b-456a,b to provide a smooth, finished rolled stock 407 that is edge trimmed in a manner well known in the art.

Figure 13C:
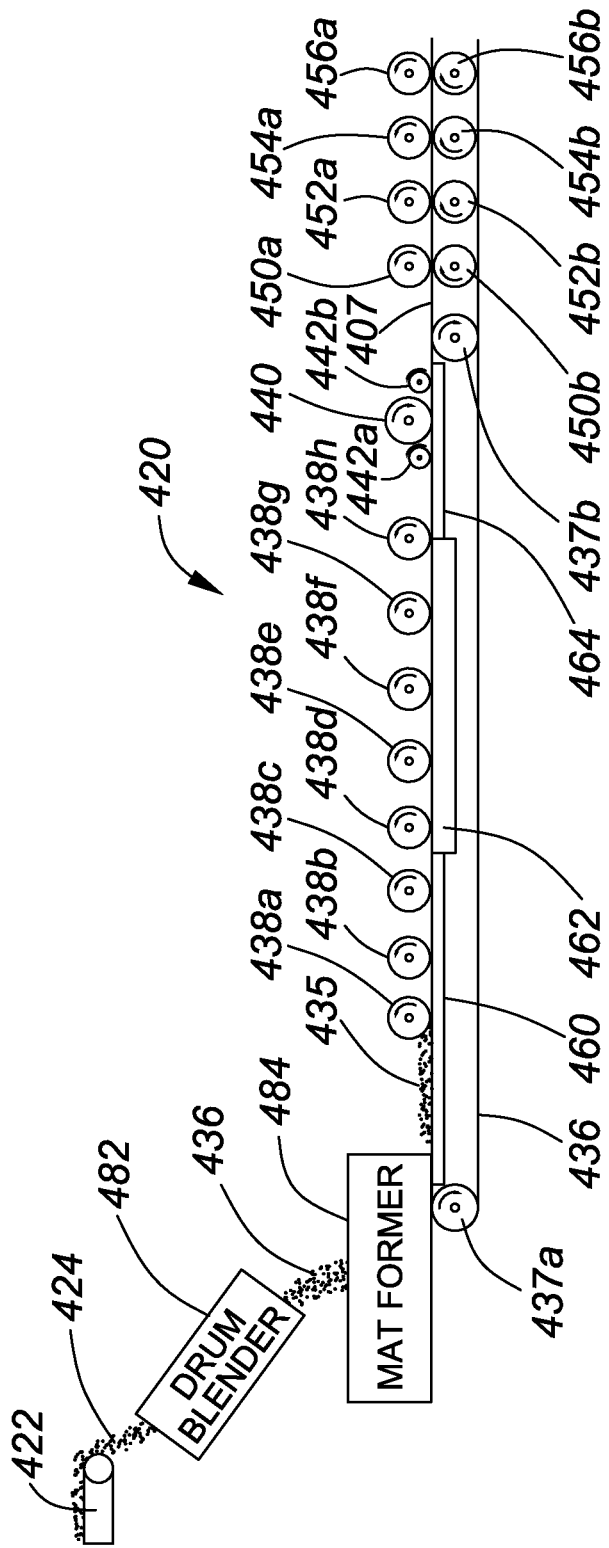
FIG. 13*c* is a schematic diagram of another exemplary apparatus for manufacturing cold rolled stock in accordance with the invention.

FIG. 13c is a schematic diagram of another exemplary apparatus 480 for manufacturing cold rolled stock 407 in accordance with the invention. The apparatus shown in FIG. 13c is the same as the apparatus described above, except that, the dried laminae 424 are fed into a drum blender 482 where adhesives and additives are sprayed onto the laminae in appropriate amounts and in an appropriate order. The damp laminae 436 are fed into a mat former 484, well known in the art for arranging strands into a mat of an appropriate depth. The remainder of the apparatus 480 is the same as the apparatus 420 described above with reference to FIG. 13b, and that description will not be repeated here.

Figure 14A:
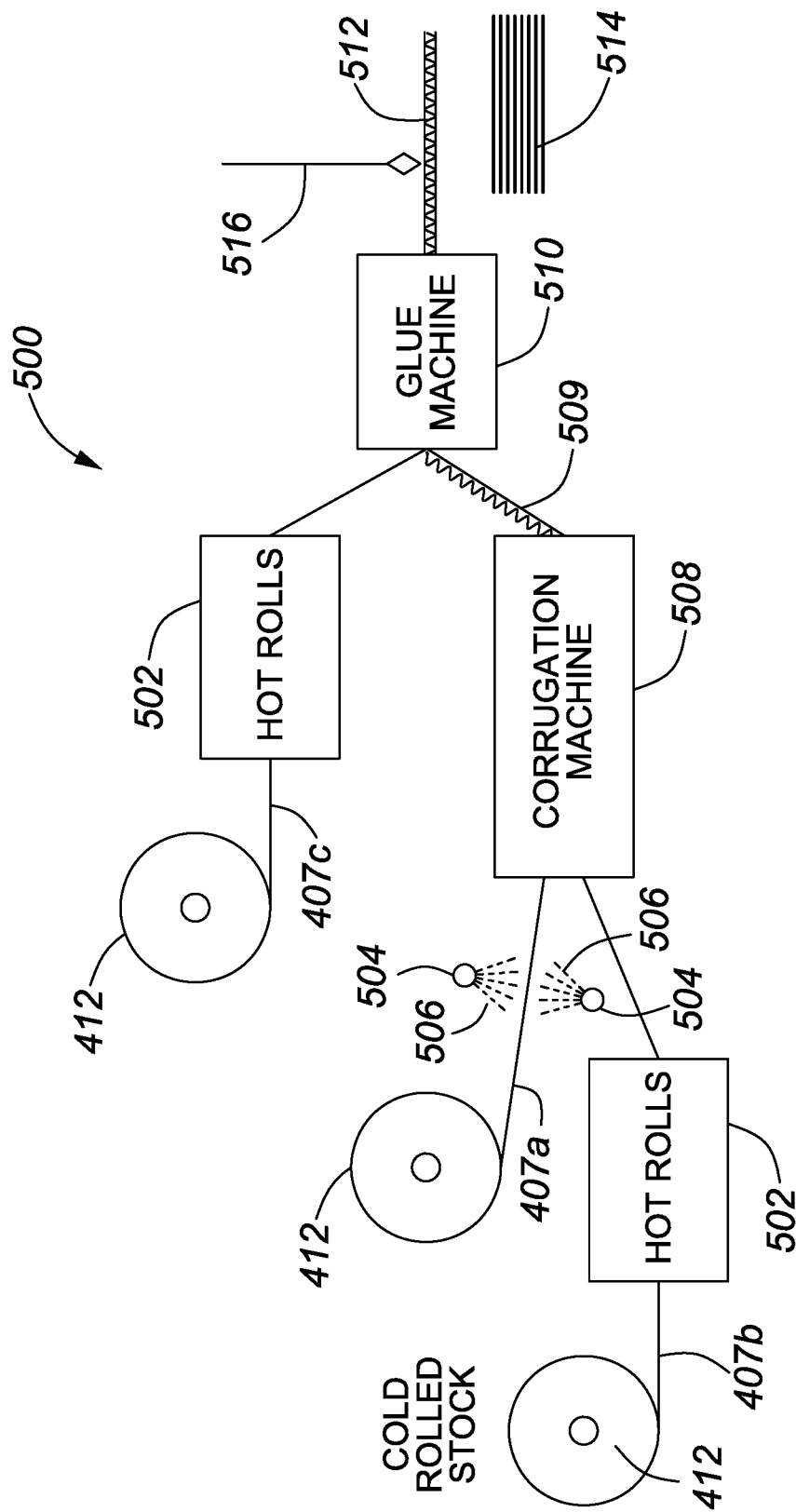
FIG. 14*a* is a block diagram of a method for manufacturing corrugated composite wood panels for light and medium duty packaging in accordance with the invention.

FIG. 14a is a block diagram of a method 500 for manufacturing corrugated composite wood panels for light and medium duty packaging in accordance with the invention. Light and medium duty corrugated packaging stock may be produced from a neat PVAc cold rolled stock 407. The corrugated packaging stock is produced by feeding a first web 407a of cold rolled stock between opposed steam pipes 504 that respectively emit a continuous spray of steam 506 onto opposite sides of the cold stock web 407a to soften it in preparation for corrugation. The softened web is fed into a corrugation machine 508. In this example, the corrugation machine 508 is a "single facer" well known in the art, but a "double facer" could be used. Simultaneously, a second web of cold rolled stock 407b is fed through optional hot rolls 502 and into the corrugation machine 508. The optional hot rolls 502 heat the web to further set the PVAc. While PVAc does not cross link, the hot rolls 502 ensure that any remaining diluent is driven off and to further consolidate the PVAc adhesive. The single facer 508 corrugates the first web 407a and adheres it to the second web 407b in a manner well understood in the art, and outputs a single faced corrugated web 509 that is fed to a gluing machine 510 that applies a third web 407b to an opposite side of the single faced web in a manner well known in the art. A double faced corrugated web 512 is produced. The double faced web 512 is cut into appropriately sized panels 514 using, for example, a pneumatic shear 516, well known in the art.

Figure 14B:
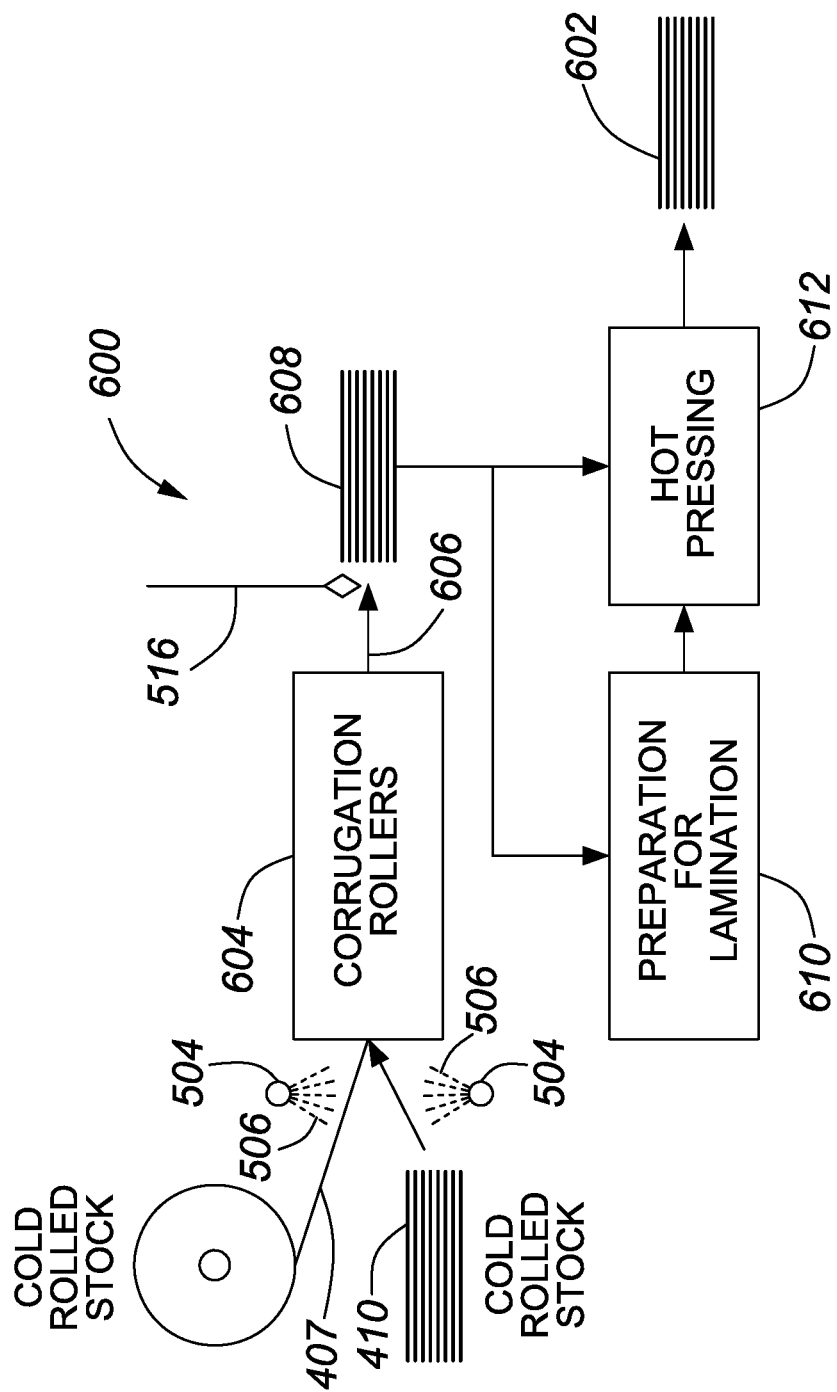
FIG. 14*b* is a block diagram of a method for manufacturing corrugated cores for composite wood panels in accordance with the invention.

FIG. 14*b* is a block diagram of a method 600 for manufacturing corrugated cores 602 for composite wood panels in accordance with the invention. Corrugated cores 602 are used to assemble composite wood panels for medium and heavy duty packaging, shelving, construction panels and any other application where light weight, durable, rigid panels are desirable. The corrugated cores are manufactured using the hybrid adhesive system described above.

The cold rolled stock 407 or cold rolled panels 410 are passed between steam tubes 504, described above, where steam 506 softens the cold rolled stock before it enters corrugation rollers 604, which corrugate the cold rolled stock to a desired profile, as will be explained below with reference to FIGS. 16 and 17. The corrugated core stock 606 is cut, if required, using the pneumatic shear 516 into core panels 608. The core panels 608 may go directly to the hot press 612, where matching heated corrugation platens cure the hot set adhesive to lock the corrugation into the panels. In one embodiment, the corrugation platens are heated to about 170° C. (340° F.). A hot press dwell of about 1-3 minutes is required, depending on the thickness of the core.

In another embodiment, for corrugated cores 602 of greater strength, the corrugated core panels 608 are prepared for lamination 610. Preparation for lamination 610 may simply involve stacking two or more corrugated core panels 608 together as the PF/PVAc already on and in the corrugated core panels 608 will bond stacked panels together. Alternatively, preparation for lamination may further involve applying a hot set adhesive between facing sides of the core panels 608 to further enhance the inter-panel bond. Any number of core panels 608 may be laminated together to achieve the desired core strength. After preparation for lamination 610, the stacked cored panels 608 are moved to the hot press 612, equipped with appropriately contoured platens. As will be understood by those skilled in the art, the dwell time in the hot press is adjusted to the thickness of the corrugated core 602 to ensure that the hot set adhesive is cured throughout the corrugated core 602.

Figure 15:
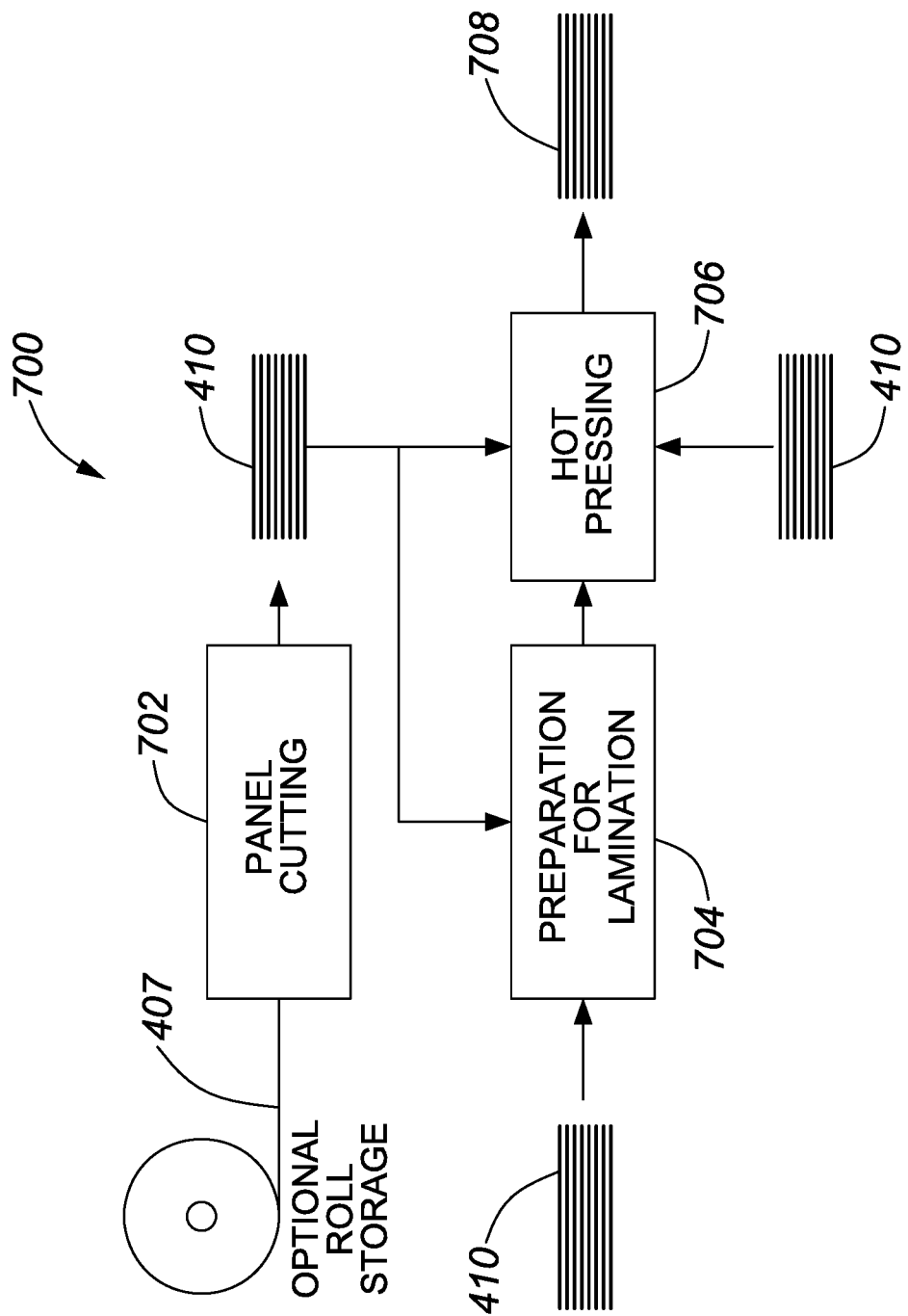
FIG. 15 is a block diagram of a method for manufacturing flat composite wood panels in accordance with the invention.

FIG. 15 is a block diagram of a method 700 for manufacturing flat composite wood panels 708 in accordance with the invention. The cold rolled stock 407, if produced, is feed to a panel cutter 702 where it is cut into appropriately sized panels 410. The panels 410 may be fed directly to a hot press 706, or prepared for lamination 704. Preparation for lamination 704 may involve simply stacking two or more panels 410 together to yield a flat panel of the desired thickness, or may involve applying a hot set adhesive between opposing faces of the panels 410 to ensure a yet stronger bond between laminated panels 410. Any number of panels 410 may be stacked together to produce a flat panel 708. The hot press 706 has opposed flat platens, known in the art. The flat platens are heated to about 170° C. (340° F.). A hot press dwell of about 1-3 minutes is required, depending on the thickness of the panel.

Figure 16:
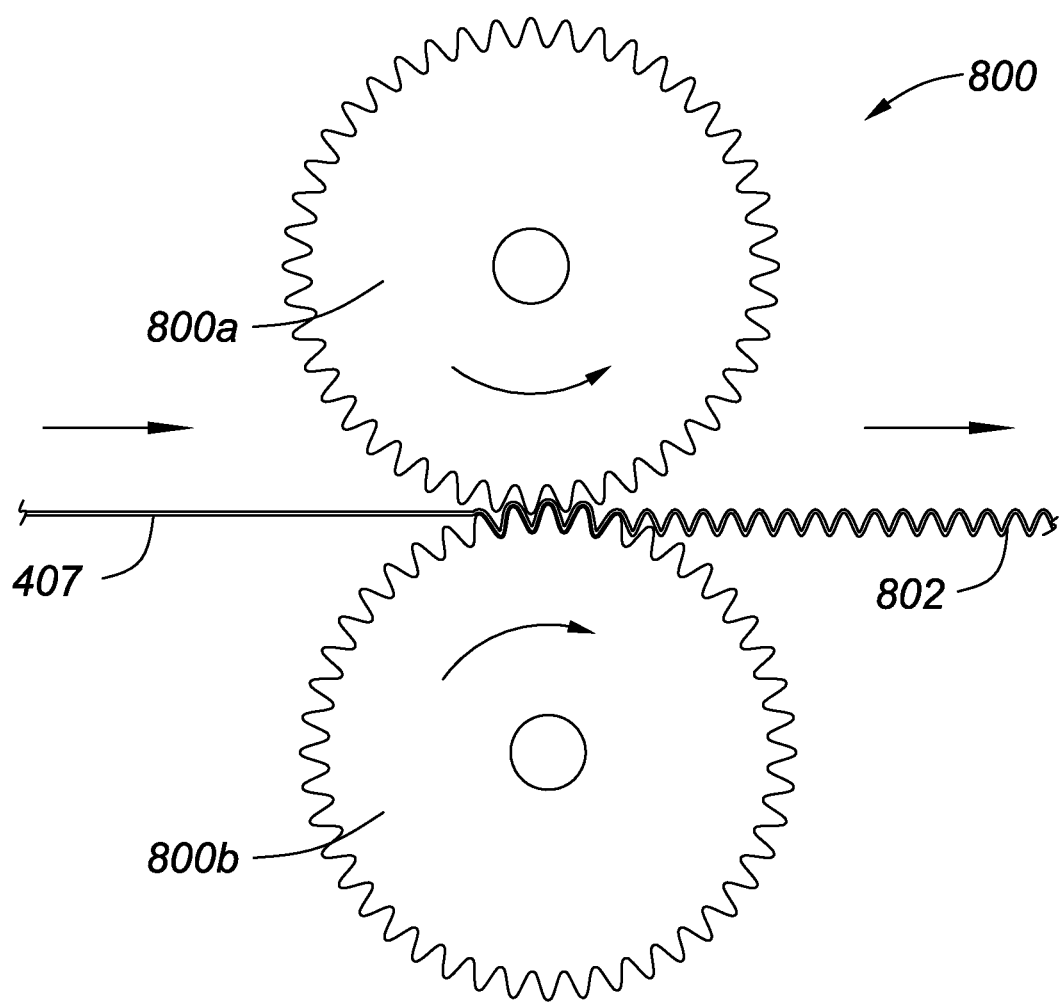
FIG. 16 is a schematic diagram of corrugation rollers for manufacturing the corrugated cores for composite wood panels in accordance with the invention.

FIG. 16 is a schematic diagram of corrugation rollers 800 for manufacturing the corrugated cores for composite wood panels in accordance with the invention. Aside from tolerance between the rolls, corrugation rolls 800*a*, 800*b* are like cardboard corrugation rolls. The steam heated cold rolled stock 407 in thicknesses up to at least 1 mm can be corrugated by the corrugation rollers 800*a*, 800*b*. A wave height of 5 mm (0.2") is readily achieved. After corrugation, corrugated stock 802 is heat set as soon as possible, as explained above with reference to FIG. 14*b*.

Figure 17:
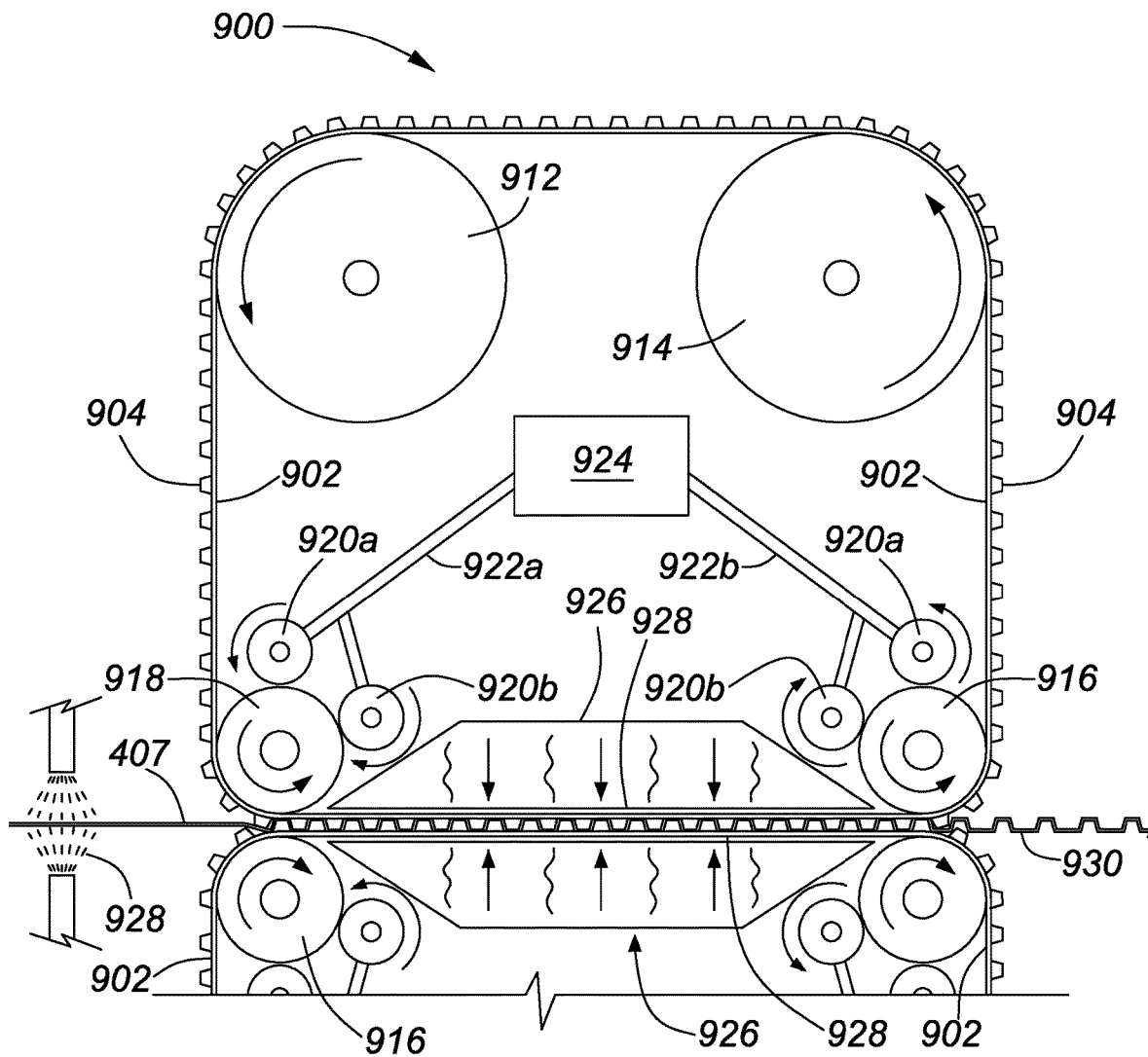
FIG. 17 is a schematic diagram of a corrugation machine for manufacturing the corrugated cores for composite wood structural panels in accordance with the invention.
Figure 17A:
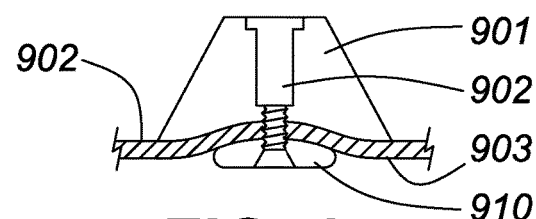
FIG. 17*a* is a detailed view of an attachment of a corrugation lug to a belt of the corrugation machine shown in FIG. 17.

FIG. 17 is a schematic diagram of a corrugation machine 900 for corrugating cores for composite wood structural panels in accordance with the invention, and FIG. 17*a* is a detailed view of an attachment of a corrugation lug 904 to a belt 902 of the corrugation machine 900 shown in FIG. 17.

Cold rolled stock 407 is corrugated with flat wave crests to provide more adhesive area, greater rigidity and increased strength for structural panels. Corrugating cold rolled stock with flat wave crests is not as readily accomplished as corrugating with rounded wave crests, and cannot be done with simple corrugation rollers. Consequently, a novel corrugation machine 900 has been invented. The details of the construction and operation of the corrugation machine 900 is beyond the scope of this description and the subject of a separate patent application. Nonetheless, detail adequate to understand the basic operation of the corrugation machine 900 is provided. Two Kevlar® fabric webs 902 (see FIG. 17*a*), that are respectively about 1 mm thick and of an appropriate length and width, 3.94 m (100") wide for example, support a plurality of metal or metal replacement plastic corrugation lugs 904, spaced-apart so that the respective corrugation lugs 904 mesh when two fabric webs 902 are juxtaposed, and there is a required clearance between the respective juxtaposed corrugation lugs 904 for the cold rolled stock 407 being corrugated. The respective corrugation lugs 904 respectively extend a full width 3.94 m (100") for example, of the fabric webs 904, but need not be single pieces so long as joints in adjacent corrugation lugs 904 are staggered. The corrugation lugs 904 are affixed to the respective fabric webs 902 by, for example, Rivnuts® 906 and Rivscrews® 908, both of which are well known in the art. A low friction plastic backing strip 910 supports the Rivscrews® 908 and secures the corrugation lugs 904 to the respective fabric webs 902. The respective fabric webs 902 are supported by and rotate around a drive roller 912, and a plurality of idler rollers 914, 916, 918, three of which are shown by way of example only. The drive roller 902 is, for example, a rubber coated steel conveyor belt drive roller, well known in the art. The roller, support and drive structures for the respective fabric webs 902 are identical, though only the top structure is completely illustrated.

A diameter of the idler rollers 916, 918 is important to ensure that the cold rolled stock 407 can be corrugated without compromising a structural integrity of, the cold rolled stock 407. For a 5 mm (0.2") corrugation height, the idler rollers 916, 918 are about 28.6 mm (1⅛"). For a 3 mm (0.12") corrugation height, the idler rollers 916, 918 are about 22.2 mm (⅞"). Because of their diameter, the corrugation rollers 916, 918 require bearing support, which can be provided in a number of ways. In one embodiment, the bearings are sealed bearings 920*a*, 920*b*, which ride on an outer surface of the respective, idler rollers 916, 918. The pairs of bearings 920*a*, 920*b* are spaced apart along a length of the respective idler rollers 916, 918. The bearings 920*a*, 920*b* are rigidly supported by support arms 922*a*, 922*b* affixed to a central support beam 924. Rigidly supported between the idler rollers 916, 918 is a heated pressure chamber 926 having a flexible bottom face 928 (of Teflon® coated sheet metal, for example). The heated pressure chambers 926 are pressurized and heated using, hot air or steam, or compressed air and an electric resistance element.

In use, cold rolled stock 407 is steam heated at 928 as it enters the corrugation machine 900. The heated pressure chambers 926 urge the juxtaposed corrugation webs 902 together to ensure a good corrugation while heat from the heated pressure chambers 926 drives off moisture from the steam heated cold rolled stock 406 to set the corrugations in the corrugated web 930 for further processing, if required, as explained above with reference to FIG. 14b.

Figure 18:
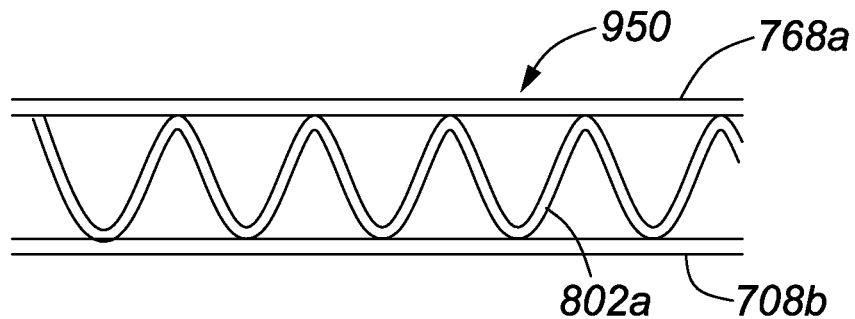
FIG. 18 is a schematic cross-sectional view of a light duty composite wood panel with a corrugated core in accordance with the invention.

FIG. 18 is a schematic cross-sectional view of a light duty composite wood panel 950 with a corrugated core 802a described above with reference to FIG. 16. The light duty composite wood panel 950 has opposed flat face panels 708a, 708b, described above with reference to FIG. 15. The flat face panels may be single ply, or laminated face panels. The light duty composite wood panel 950 is useful in any application that calls for cardboard, including food packaging.

Figure 19:
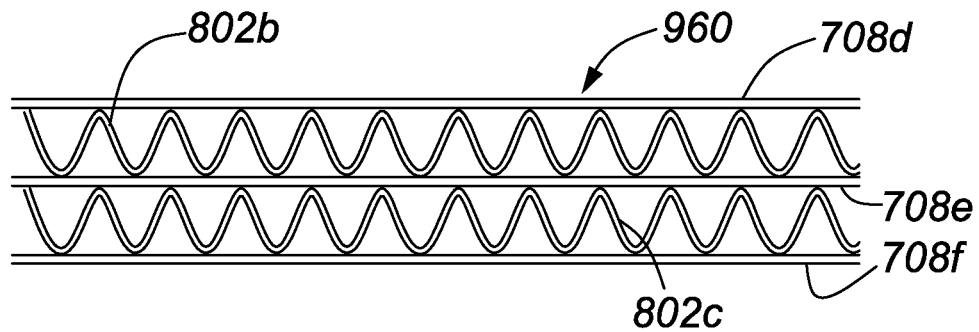
FIG. 19 is a schematic cross-sectional view of a medium duty composite wood panel with a corrugated core in accordance with the invention.

FIG. 19 is a schematic cross-sectional view of a medium duty composite wood panel 960 with corrugated cores 802b, 802c described above with reference to FIG. 16. The corrugated cores 802b, 802c are interleaved by a flat panel 708e. Opposed face panels 708d, 708f may be single ply or laminated face panels. The composite wood panel 960 is suitable for medium duty packaging for shipping, etc. and light duty construction.

Figure 20:
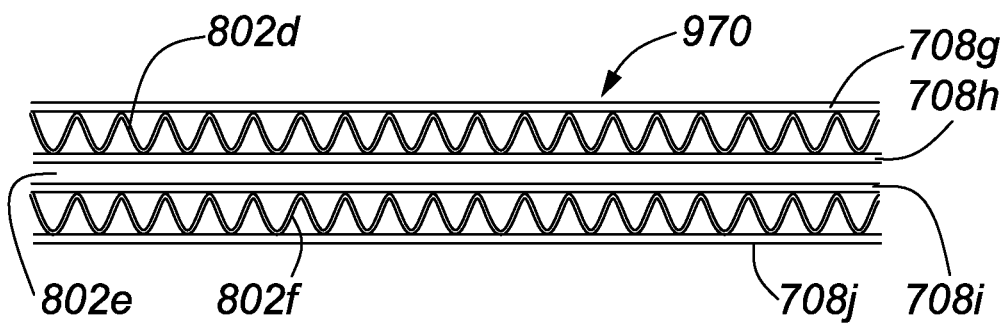
FIG. 20 is a schematic cross-sectional view of a heavy duty composite wood panel with a corrugated core in accordance with the invention.

FIG. 20 is a schematic cross-sectional view of a heavy duty composite wood panel 970 with a corrugated core described above with reference to FIG. 16. In this embodiment, three corrugated cores 802d, 802e and 802f are sandwiched between four flat panels, 708g, 708h, 708i, 708j. Face panels 708g and 708j may be single ply or laminated panels. The middle corrugated core 802e is preferably oriented at a right angle with respect to outer corrugated cores 802d and 802f. This lends rigidity and strength to the composite wood panel 970. The composite wood panel 970 is suitable for use in heavy duty packaging for shipping and storage, and has construction applications.

Figure 21:
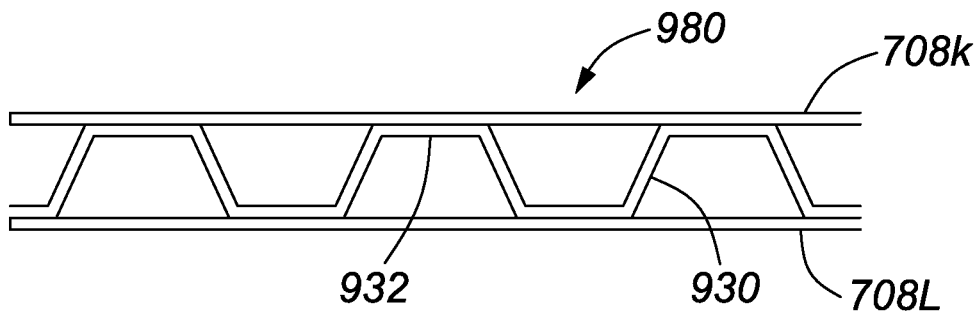
FIG. 21 is a schematic cross-sectional view of a structural composite wood panel with a corrugated core in accordance with the invention.

FIG. 21 is a schematic cross-sectional view of a structural composite wood panel 980 with a corrugated core 930 described above with reference to FIGS. 17 and 17a. The composite wood panel 980 has opposed, flat face panels 708k, 708l. The flat face panels 708k, 708l may be single ply or laminated panels. The corrugated core 930 has flat crests 932 that provide a wide adhesive surface for attachment to the respective face panels 708k, 708l. The corrugated core 932 may be single ply or laminated. Any practical number of corrugations can be laminated together using heat set adhesive to achieve any desired strength. The composite wood panel 980 is useful wherever plywood serves a purpose. It can be used for sheathing, flooring, cabinet construction, heavy duty packaging, etc. By way of example, a composite wood panel 980 with two ply face panels (two 3 mm panels laminated together) and a 4 ply core (four 1 mm cores laminated together) is 20 mm (about ¾") thick, but it is lighter than ¾" plywood and made with much less expensive materials.

It should be understood that the structural panel shown in FIG. 21 can also be laid up with multiple cores as shown in FIGS. 19 and 20 for applications that require extreme strength and rigidity, low vibration transmission, and minimal thermal expansion.

I claim:

1. A method of manufacturing a composite wood panel, comprising steps of:
   cutting wood laminae having a length of about 75 mm-150 mm, a width of about 10 mm-50 mm, and a thickness of about 0.25 mm-2.5 mm;
   drying the wood laminae to about 10% moisture content;
   sorting the wood laminae so that all wood laminae for the composite wood panel have dimensions within a tolerance of 5% in length and thickness and a tolerance of 10% in width;
   applying a cold set adhesive to the wood laminae;
   forming the wood laminae into a mat of randomly oriented wood laminae, the mat having a thickness adequate to produce a cold rolled stock of 0.5 mm-3 mm; and
   cold rolling the mat to form the cold rolled stock.

2. The method as claimed in claim 1 further comprising steps of:
   steam heating the cold rolled stock; and
   corrugating the cold rolled stock.

3. The method as claimed in claim 2 further comprising steps of:
   cutting the cold rolled stock into panels; and
   stacking together at least two of the corrugated panels and pressing the stacked panels in a hot press with corrugated platens to permanently bond the corrugated panels to form a laminated core panel.

4. The method as claimed in claim 2 wherein corrugating the cold rolled stock comprises running the cold rolled stock through corrugation rollers to form corrugated stock having rounded corrugation crests.

5. The method as claimed in claim 4 further comprising heating the cold rolled stock during corrugation to drive off moisture and set the corrugations for further processing.

6. The method as claimed in claim 5 further comprising steps of:
   cutting, the corrugated stock into corrugated panels; and
   pressing the corrugated panels in a hot press with corrugated platens to permanently set the corrugations in the corrugated panels.

7. The method as claimed in claim 6 further comprising a step of stacking together at least two of the flat panels and pressing the stacked flat panels in a hot press with flat platens to permanently bond the flat panels to form a laminated flat panel.

8. The method as claimed in claim 7 further comprising a step of preparing the panels for lamination by applying a hot set adhesive between the respective panels prior to pressing the panels in the hot press to reinforce the permanent bond.

9. The method as claimed in claim 2 wherein corrugating the cold rolled stock comprises running the cold rolled stock through a corrugation machine to form corrugated stock having flat corrugation crests.

10. The method as claimed in claim 1 further comprising steps of:
    cutting the cold rolled stock into panels; and
    pressing the panels in a hot press with flat platens to permanently set the flat panels.

11. The method as claimed in claim 1 further comprising a step of applying a hot set adhesive to the wood laminae.

12. The method as claimed in claim 11 wherein the step of applying the hot set adhesive to the wood laminae comprises applying the hot set adhesive prior to applying the cold set adhesive.

13. The method as claimed claim 1 further comprising a step of applying a waterproofing wax to the wood laminae.

14. The method as claimed in any one of claim 1 further comprising a step of applying a fungicide to the wood laminae.

15. The method as claimed in any claim 1 further comprising a step of applying an insecticide to the wood laminae.

16. A method of manufacturing a composite wood panel, comprising steps of:
    cutting wood laminae having a length of about 75 mm-150 mm, a width of 10 mm-50 mm, and a thickness of 0.25 mm-2.5 mm;

drying the wood laminae to about 10% moisture content;

sorting the wood laminae so that all wood laminae for the composite wood panel have dimensions within a tolerance of 5% in length and thickness and a tolerance of 10% in width;

applying a hot set adhesive to the wood laminae;

applying a cold set adhesive to the wood laminae;

forming the wood laminae into a mat of randomly oriented wood laminae, the mat having a thickness adequate to produce a cold rolled stock of 0.5 mm-3 mm; and cold rolling the mat to form the cold rolled stock.

17. A method of manufacturing a thin, pliable composite wood panel, comprising steps of:

cutting wood laminae to a target wood laminae size having dimensions within a range of: a length of about 75 mm-150 mm, a width of about 10 mm-50 mm, and a thickness of about 0.25 mm-1.0 mm;

drying the cut wood laminae to about 10% moisture content;

screening the dried wood laminae to remove dust and fines and produce screened wood laminae;

sorting the screened wood laminae using an inertial sort process to produce sorted wood laminae for the composite wood panel, all of the wood laminae for the composite wood panel having dimensions within a tolerance of 5% in length and thickness and a tolerance of 10% in width of the target wood laminae size;

applying a cold set adhesive to the sorted wood laminae using an adhesive misting system as the sorted wood laminae are formed into a mat of randomly oriented sorted wood laminae, the mat having a thickness adequate to produce a cold rolled stock of 0.5 mm-3 mm; and cold rolling the mat to form the cold rolled stock.

18. The method as claimed in claim 17 further comprising steps of:

steam heating the cold rolled stock; and corrugating the cold rolled stock.

19. The method as claimed in claim 18 wherein corrugating the cold rolled stock comprises running the cold rolled stock through corrugation rollers to form corrugated stock having rounded corrugation crests.

20. The method as claimed in claim 18 wherein corrugating the cold rolled stock comprises running the cold rolled stock through a corrugation machine to form corrugated stock having flat corrugation crests.

21. The method as claimed in claim 20 further comprising heating the cold rolled stock during corrugation to drive off moisture and set the corrugations for further processing.

* * * * *